United States Patent
Kim et al.

(10) Patent No.: US 11,442,491 B2
(45) Date of Patent: Sep. 13, 2022

(54) DYNAMIC POWER MONITOR MONITORING POWER BASTED ON CLOCK CYCLE, PROCESSOR, AND SYSTEM ON CHIP

(71) Applicant: SAMSUNG ELECTRONICS CO., LTD., Suwon-si (KR)

(72) Inventors: Byung-Su Kim, Seoul (KR); Taekkyun Shin, Kwangmyong-si (KR); Chun-Guan Kim, Yongin-si (KR); Yohan Kwon, Seoul (KR); Yun Heo, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 112 days.

(21) Appl. No.: 15/931,043

(22) Filed: May 13, 2020

(65) Prior Publication Data

US 2021/0116955 A1    Apr. 22, 2021

(30) Foreign Application Priority Data

Oct. 16, 2019    (KR) .................. 10-2019-0128296

(51) Int. Cl.
| | | |
|---|---|---|
| G06F 1/08 | (2006.01) | |
| G06F 1/26 | (2006.01) | |
| G06F 9/54 | (2006.01) | |
| G06F 11/30 | (2006.01) | |
| G06F 1/10 | (2006.01) | |
| G06F 1/3234 | (2019.01) | |
| G06F 1/324 | (2019.01) | |
| G06F 1/3296 | (2019.01) | |
| G06F 1/3206 | (2019.01) | |
| G06F 1/06 | (2006.01) | |
| G06F 1/3237 | (2019.01) | |

(52) U.S. Cl.
CPC .................. *G06F 1/08* (2013.01); *G06F 1/26* (2013.01); *G06F 9/546* (2013.01); *G06F 11/3013* (2013.01); *G06F 11/3058* (2013.01)

(58) Field of Classification Search
CPC .......... G06F 1/26; G06F 1/08; G06F 11/3058; G06F 11/3103; G06F 9/546
See application file for complete search history.

(56) References Cited

U.S. PATENT DOCUMENTS

| | | |
|---|---|---|
| 7,730,340 B2 | 6/2010 | Hu et al. |
| 8,024,684 B2 | 9/2011 | Kanazawa |
| 8,281,166 B2 | 10/2012 | Carroll |
| 8,928,385 B2 | 1/2015 | Kim et al. |

(Continued)

FOREIGN PATENT DOCUMENTS

KR    10-1655030 B1    9/2016

*Primary Examiner* — Jaweed A Abbaszadeh
*Assistant Examiner* — Gayathri Sampath
(74) *Attorney, Agent, or Firm* — Sughrue Mion, PLLC

(57) ABSTRACT

A dynamic power monitor for monitoring a power of a block in an integrated circuit is provided. The dynamic power monitor includes an input buffer configured to store first state values corresponding to internal signals of the block according to a first cycle of a clock signal; a power calculator configured to identify first power classification values corresponding to the block according to the first cycle, based on the first state values; and a filter configured to identify a first filtered value of the first power classification values.

20 Claims, 17 Drawing Sheets

(56) References Cited

U.S. PATENT DOCUMENTS

| | | | |
|---|---|---|---|
| 9,026,822 B2 | 5/2015 | Miwa et al. | |
| 9,054,680 B2 | 6/2015 | Kim et al. | |
| 9,063,730 B2 | 6/2015 | Dighe et al. | |
| 9,130,390 B2 | 9/2015 | Besser et al. | |
| 9,329,663 B2 | 5/2016 | Jane et al. | |
| 9,424,381 B2 | 8/2016 | Dhanwada et al. | |
| 9,588,577 B2 | 3/2017 | Ahn et al. | |
| 9,639,363 B2 | 5/2017 | Lukefahr et al. | |
| 9,829,952 B2 | 11/2017 | Park et al. | |
| 10,146,286 B2 | 12/2018 | Lee et al. | |
| 2007/0083350 A1 | 4/2007 | Wilcox et al. | |
| 2007/0168055 A1* | 7/2007 | Hsu | G06F 1/324 |
| | | | 700/32 |
| 2010/0269074 A1 | 10/2010 | Nation et al. | |
| 2012/0109550 A1* | 5/2012 | Naffziger | G06F 11/3062 |
| | | | 702/61 |
| 2013/0151228 A1* | 6/2013 | Yi | G06F 1/3237 |
| | | | 703/18 |
| 2014/0249782 A1 | 9/2014 | Cummings et al. | |
| 2015/0127306 A1* | 5/2015 | Sung | G06F 30/20 |
| | | | 703/2 |
| 2016/0291665 A1* | 10/2016 | Wang | G05D 23/1917 |
| 2017/0083066 A1* | 3/2017 | Mahurin | G06F 1/26 |
| 2017/0160783 A1* | 6/2017 | Kawabe | G06F 1/324 |

* cited by examiner

DYNAMIC POWER MONITOR MONITORING POWER BASTED ON CLOCK CYCLE, PROCESSOR, AND SYSTEM ON CHIP

CROSS-REFERENCE TO RELATED APPLICATION

This application claims priority from Korean Patent Application No. 10-2019-0128296 filed on Oct. 16, 2019 in the Korean Intellectual Property Office, the disclosure of which is incorporated by reference herein in its entirety.

BACKGROUND

Field

Methods and apparatuses consistent with example embodiments relate to dynamic voltage and frequency scaling (DVFS), and dynamically monitoring power based on a clock cycle.

Related Art

DVFS allows power consumption to change according to a necessary performance (i.e., a workload) in a computer system. The computer system may use a minimum required power through the DVFS to provide the necessary performance. The DVFS may adjust an operating voltage and frequency of a clock signal, thereby reducing power of the computer system.

A computer system may measure power consumption and perform the DVFS based on a result of the measurement. A computer system may measure power consumption by counting instructions to be processed or by measuring how much an external power supply voltage fluctuates. Because dynamic power consumption may be measured in units of milliseconds, improved methods for dynamic power monitoring are needed for the DVFS due to a difference between times to process instructions, a difference between schemes to process the instructions, and a difference between fluctuations of the external power supply voltage and fluctuations of an internal power supply voltage.

SUMMARY

One or more example embodiments provide a dynamic power monitor to monitor a power based on a clock cycle. The dynamic power monitor may be implemented in a processor or a system on chip.

According to an example embodiment, a dynamic power monitor for monitoring power of a block in an integrated circuit is provided. The dynamic power monitor includes: an input buffer configured to store first state values corresponding to internal signals of the block according to a first cycle of a clock signal; a power calculator configured to identify first power classification values corresponding to the block according to the first cycle, based on the first state values; and a filter configured to identify a first filtered value of the first power classification values.

According to an example embodiment, a processor includes a plurality of cores, each of which includes an internal logic circuit and a dynamic power monitor, the internal logic circuit being configured to operate based on an operating voltage and a clock signal, and the dynamic power monitor being configured to monitor power by using state values of internal signals of the internal logic circuit according to cycles of the clock signal; an output controller configured to generate a trigger signal based on a monitoring result provided by the dynamic power monitor; a clock manager configured to scale the clock signal provided to the plurality of cores based on the trigger signal; and an internal voltage regulator configured to scale the operating voltage provided to the plurality of cores based on the trigger signal.

According to an example embodiment, a system on chip includes a central processing unit cluster including a plurality of first cores, each of which includes a first dynamic power monitor; a graphics processing unit cluster including a plurality of second cores, each of which includes a second dynamic power monitor; a first internal voltage regulator configured to scale a first operating voltage provided to the plurality of first cores based on a first monitoring result of the first dynamic power monitor, according to a first clock signal; a first clock manager configured to scale the first clock signal provided to the plurality of first cores based on the first monitoring result; a second internal voltage regulator configured to scale a second operating voltage provided to the plurality of second cores based on a second monitoring result of the second dynamic power monitor, according to a second clock signal; and a second clock manager configured to scale the second clock signal provided to the plurality of second cores based on the second monitoring result.

BRIEF DESCRIPTION OF THE FIGURES

The above and other objects and features will be more clearly understood from the following detailed description, taken in conjunction with the accompanying drawings, in which.

DETAILED DESCRIPTION

Figure 1:
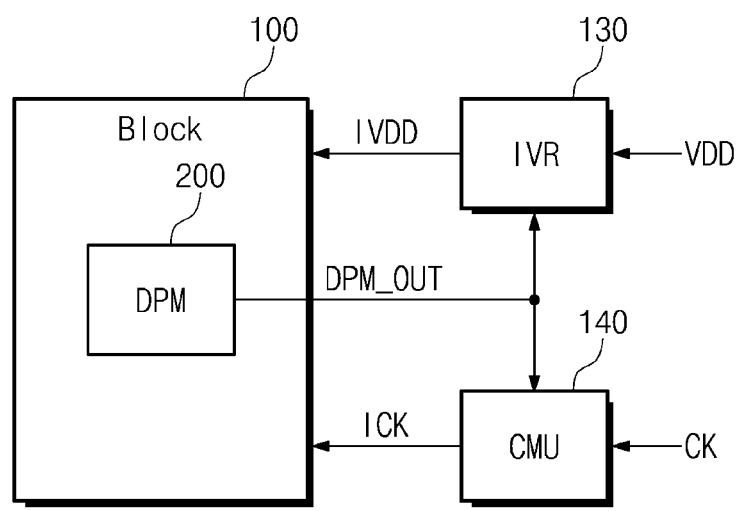
FIG. 1 illustrates a block diagram of an integrated circuit according to an example embodiment.

FIG. 1 illustrates a block diagram of an integrated circuit according to an example embodiment. For example, an integrated circuit 10 may be supplied with a power supply voltage VDD and a clock signal CK from the outside and may operate based on the power supply voltage VDD and the clock signal CK. The integrated circuit 10 may include a block 100, an internal voltage regulator (IVR) 130 and a clock managing unit (CMU) 140.

A block 100 may be an intellectual property (IP) block. The block 100 may indicate various hardware-based analog or digital circuits, which constitute the integrated circuit 10, such as a processor, a memory controller, a cache memory, a memory device, and an image sensor. The block 100 may operate based on an operating voltage IVDD and a clock signal ICK. Here, "I" indicates the inside of the integrated circuit 10. The block 100 may include a dynamic power monitor (DPM) 200.

The dynamic power monitor 200 may be a circuit that monitors a power of the integrated circuit 10 or the block 100. The dynamic power monitor 200 may be implemented in the block 100 of the integrated circuit 10 in the form of hardware. The dynamic power monitor 200 may provide a monitoring result DPM_OUT to the internal voltage regulator 130 and the clock managing unit 140. For example, when the block 100 performs operations accompanying various workloads, the dynamic power monitor 200 may calculate a power consumed at the block 100 in real time or dynamically according to a cycle of the clock signal ICK.

The internal voltage regulator 130 may generate the operating voltage IVDD by using the power supply voltage VDD supplied from the outside of the integrated circuit 10. The internal voltage regulator 130 may scale (or regulate) a level of the operating voltage IVDD based on the monitoring result DPM_OUT. Unlike the example illustrated in FIG. 1, the internal voltage regulator 130 may be disposed within the block 100.

The clock managing unit 140 may generate the clock signal ICK by using the clock signal CK. The clock managing unit 140 may operate based on the power supply voltage VDD supplied from the outside of the integrated circuit 10 or the operating voltage IVDD generated by the internal voltage regulator 140. The clock managing unit 140 may scale/regulate a frequency (or a speed) of the clock signal ICK based on the monitoring result DPM_OUT. The frequency of the clock signal ICK may be referred to as an "operating frequency" of the integrated circuit 10. The clock managing unit 140 may also be referred to as a "clock managing circuit" and may be disposed within the block 100 unlike the example illustrated in FIG. 1.

The dynamic power monitor 200 according to an example embodiment may monitor a power consumed at the block 100 every cycle of the clock signal ICK. To this end, the dynamic power monitor 200 may calculate a power of the block 100 by using internal signals of the block 100. The integrated circuit 10 may perform dynamic voltage and frequency scaling (DVFS) that checks a power of the block 100 calculated and monitored by the dynamic power monitor 200 in units of nanosecond and quickly scales the operating voltage IVDD and a frequency of the clock signal ICK. The dynamic power monitor 200, the internal voltage regulator 130, and the clock managing unit 140 may constitute a DVFS system.

Figure 2:
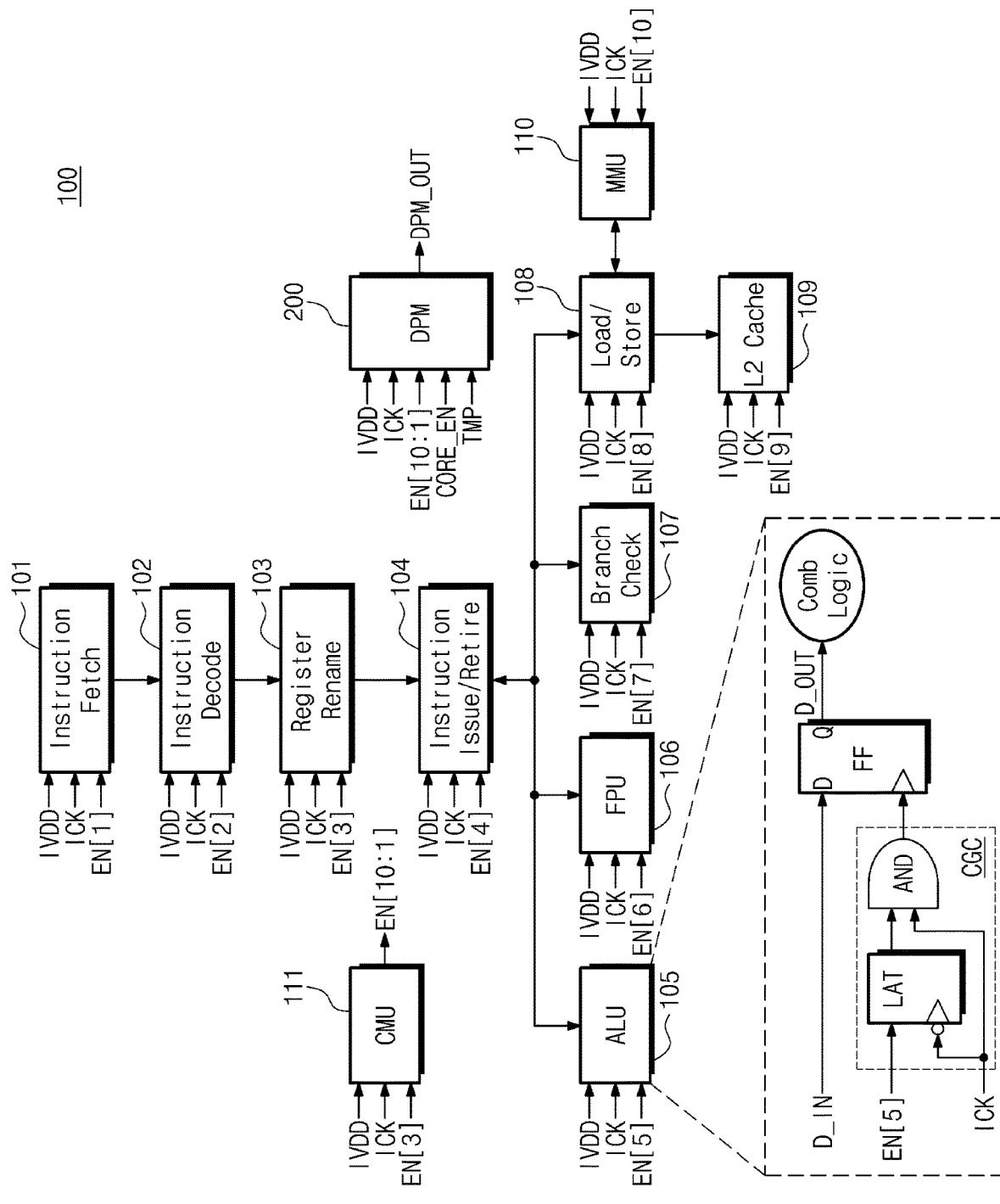
FIG. 2 illustrates a detailed block diagram of a block of an integrated circuit according to an example embodiment.

FIG. 2 illustrates a detailed block diagram of a block according to an example embodiment. The block 100 is, for example, a core of a processor, but the example of the block 100 is not limited to a core. The core 100 may include a fetch unit 101, a decode unit 102, a register rename unit 103, an issue/retire unit 104, an arithmetic logic unit (ALU) 105, a floating-point unit (FPU) 106, a branch check unit 107, a load/store unit 108, an L2 cache memory 109, a memory management unit (MMU) 110, a clock managing unit 111, and the dynamic power monitor 200. Here, the term "unit" may be interchangeable with the term "circuit".

The fetch unit 101 may fetch an instruction with reference to a memory address stored in a program counter tracing the memory address of the instruction and may store the fetched instruction in an instruction register. For example, the instruction may be stored in a hardware memory (e.g., one of an internal register of the core 100, the L2 cache memory 109, a cache memory placed outside the core 100 and inside the integrated circuit 10, or a main memory placed outside the integrated circuit 10). The decode unit 102 may decode the instruction stored in the instruction register and may determine which instruction will be executed. The register rename unit 103 may map logic registers designated by the instruction onto physical registers in the core 100. The register rename unit 103 may remove dependence between the instructions by mapping logic registers designated by consecutive instructions onto different physical registers. The issue/retire unit 104 may control when a decoded instruction is issued (or dispatched) to pipelines and when returned results are retired.

The ALU 105 may perform an arithmetic operation, a logic operation, or a shift operation based on the dispatched instructions. The ALU 105 may be provided with an operation code, an operand, etc., that is necessary for an operation, from a hardware memory. The FPU 106 may perform a floating-point operation. The branch check unit 107 may identify that a branch direction of a branch instruction is predicted, for the purpose of improving a flow of pipelines. The load/store unit 108 may execute load and store instructions, may generate virtual addresses necessary for the load and store operations, and may load data from the hardware memory or may store data in the hardware memory. The memory managing unit 110 may translate virtual addresses that are used as software (e.g., an application program, an operating system, and a device driver) is executed by the core 100 into physical addresses that are used at a hardware memory. The memory management unit 110 may manage address translation information between the virtual addresses and the physical addresses. The clock managing unit 111 may generate clock gating signals EN[10:1] based on the operating voltage IVDD and the clock signal ICK. The clock managing unit 111 inside the core 100 and the clock managing unit 140 outside the core 100 may be different from each other. The clock gating signals EN[10:1] may be signals that are used to reduce a power of the above components 101 to 110 and may enable or disable the clock signal ICK at the above components 101 to 110, respectively. The components 101 to 111 of the core 100 may be provided or supplied with the operating voltage IVDD and the clock signal ICK and may operate based on the operating voltage IVDD and the clock signal ICK.

Referring to FIG. 2, for example, the ALU 105 may include a clock gating circuit CGC, a flip-flop FF, and a combinational logic circuit. The clock gating circuit CGC may provide the clock signal ICK to the flip-flop FF while the clock gating signal EN[5] is enabled. While the clock gating signal EN[5] is disabled, the clock gating circuit CGC may not provide the clock signal ICK to the flip-flop FF or may block the clock signal ICK. For example, the clock gating circuit CGC may include a latch LAT gating the clock signal ICK and a logic gate AND performing an AND operation. The latch LAT may latch the clock gating signal EN[5] based on an inverted signal of the clock signal ICK. The logic gate AND may perform the AND operation on an output signal of the latch LAT and the clock signal ICK. The way to implement the clock gating circuit CGC is not limited to the example illustrated in FIG. 2. The flip-flop FF may latch a data input D_IN at an edge of a clock signal provided from the clock gating circuit CGC and may output the latched data input D_IN as a data output D_OUT. The combinational logic circuit may perform various logic operations (e.g., NAND, AND, NOR, OR, XNOR, and XOR operations) on the data output D_OUT.

A power consumed at the core 100 may be categorized as a static power and a dynamic power. For example, the dynamic power $P_{Dynamic}$ may be defined by Equation 1 below.

$$P_{Dynamic} = \alpha \times C_{Load} \times \text{Freq} \times VDD^2 \qquad \text{[Equation 1]}$$

In Equation 1, "α" may denote a toggling rate of circuits of the core 100, "$C_{Load}$" may denote a load capacitance of the circuits of the core 100, "Freq" may denote a frequency of the clock signal ICK, and "VDD" may denote a level of the operating voltage IVDD. Because the clock signal ICK is provided to the flip-flop FF when the clock gating signal EN[5] is enabled, a dynamic power consumed by the flip-flop FF and the combinational logic circuit may increase (i.e., an increase of "α"). In contrast, because the clock signal ICK is not provided to the flip-flop FF when the clock gating signal EN[5] is disabled, a dynamic power consumed by the flip-flop FF and the combinational logic circuit may decrease (i.e., a decrease of "α"). A state value of the clock gating signal EN[5] may be a first logical value (e.g., 0) indicating a disable state and a second logical value (e.g., 1) indicating an enabled state. Therefore, a state value of the clock gating signal EN[5] may directly/indirectly indicate a dynamic power consumed at the core 100, and there is a correlation between a state value and a dynamic power.

As with the clock gating signal EN[5], the remaining clock gating signals EN[10:6] and EN[4:1] may be respectively provided to the components 101 to 104 and 106 to 110 of the core 100 and may be used to gate the clock signal ICK. For example, as illustrated in FIG. 2, the ALU 105 includes one flip-flop, one combinational logic circuit, and one clock gating circuit. Similarly, each of the components 101 to 110 may include at least one flip-flop, at least one combinational logic circuit, and at least one clock gating circuit. For convenience of illustration and description, a representative example is illustrated in FIG. 2 as one clock gating signal is provided for each of the components 101 to 110, but the number of clock gating signals that each of the components 101 to 110 receives and uses may be one or more.

The dynamic power monitor 200 may receive the operating voltage IVDD and the clock signal ICK, and may operate based on the operating voltage IVDD and the clock signal ICK. The dynamic power monitor 200 may receive internal signals of the core 100 every cycle of the clock signal ICK (e.g., every CPU cycle in the case where the block 100 is a central processing unit (CPU)). The dynamic power monitor 200 may calculate a value of a power consumed by the core 100 by using internal signals every cycle of the clock signal ICK. The dynamic power monitor 200 may output the monitoring result DPM_OUT including the power value of the core 100.

For example, the internal signals may include the clock gating signals EN[10:1]. As described above, each of the clock gating signals EN[10:1] may enable or disable the clock signal ICK. The internal signals may further include a core enable signal CORE_EN (alternatively referred to as a "block enable signal") enabling or disabling the core 100. Because the core enable signal CORE_EN indicates whether the core 100 operates, the core enable signal CORE_EN may directly or indirectly indicate a dynamic power consumed at the core 100, and there is a correlation between a state value of the core enable signal CORE_EN and a dynamic power. Also, the internal signals may further include a temperature signal TMP (or a temperature limit signal) that may disable the core 100 according to whether a temperature of the integrated circuit 10 or the core 100 reaches a limited temperature. For example, the core 100 may generate heat when operating and therefore temperature of the core 100 may indicate operation of the core 100. For example, the operation of the core 100 may be disabled when the temperature signal TMP is enabled (i.e., when the temperature reaches the limited temperature); the operation of the core 100 may be enabled when the temperature signal TMP is disabled (i.e., when the temperature is below the limited temperature). There is a correlation between a state value of the temperature signal TMP and a dynamic power. State (logical) values of the above internal signals may be changed or switched according to a cycle of the clock signal ICK. The dynamic power monitor 200 may calculate a value of a power consumed by the core 100 every cycle of the clock signal ICK, by using at least one of internal signals toggling according to a cycle of the clock signal ICK.

Figure 3:
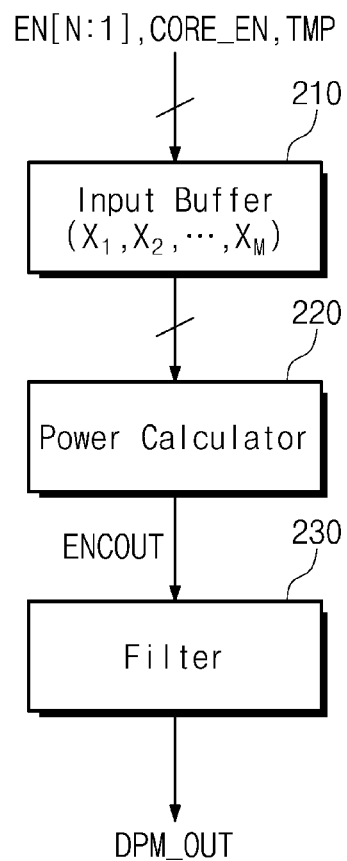
FIG. 3 illustrates a block diagram of a dynamic power monitor according to an example embodiment.

FIG. 3 illustrates a block diagram of a dynamic power monitor according to an example embodiment. A dynamic power monitor 200a may be an example of the dynamic power monitor 200 and may include an input buffer 210, a power calculator 220, and a filter 230.

The input buffer 210 may receive internal signals according to cycles of the clock signal ICK. The input buffer 210 may repeatedly receive internal signals every cycle of the clock signal ICK. The input buffer 210 may include registers that store state values $X_1, X_2 \ldots X_M$ (M being a natural number) of internal signals. The state values $X_1, X_2 \ldots X_M$ of the internal signals stored in the input buffer 210 may be changed or updated every cycle of the clock signal ICK. The internal signals may include at least one of clock gating signals EN[N:1] (N being a natural number), the core enable signal CORE_EN, and the temperature signal TMP. The input buffer 210 may provide the power calculator 220 with the stored state values $X_1, X_2 \ldots X_M$ every cycle of the clock signal ICK.

The power calculator 220 may be implemented in the integrated circuit 10 in the form of hardware so as to receive the state values $X_1, X_2 \ldots X_M$ and calculate a power classification value ENCOUT. Here, the power classification value ENCOUT may be an encoded output value indicating a range to which a power value belongs, from among a plurality of ranges, not a power value itself calculated (or expected) as being consumed by the core 100. For example, the plurality of ranges may correspond to the entire range from a minimum power of the integrated circuit 10 to a maximum power of the integrated circuit 10. A power value of the core 100 may be a real number or an integer requiring a large storage space. The power calculator 220 may calculate a power value of the core 100 and output the power classification value ENCOUT indicating a range to which the power value belongs, without outputting the power value itself. The power calculator 220 may repeatedly receive the state values $X_1, X_2 \ldots X_M$ every cycle of the clock signal ICK and may repeatedly calculate and output the power classification value ENCOUT every cycle of the clock signal ICK.

The filter 230 may repeatedly receive the power classification value ENCOUT calculated by the power calculator 220 every cycle of the clock signal ICK. The filter 230 may accumulate the power classification values ENCOUT of cycles and may calculate a filtered value of the accumulated power classification values ENCOUT. For example, the filter 230 may calculate an average value of the accumulated power classification values ENCOUT as the filtered value. The filter 230 may output the monitoring result DPM_OUT including a filtered value that is more stable than the power classification value ENCOUT. The filter 230 may filter a noise and output the filtered value instead of the power classification value ENCOUT. The noise may indicate fluctuation of the power classification value ENCOUT within a range to which a power value calculated by the power calculator 220 belongs. The filter 230 may not output the monitoring result DPM_OUT every cycle of the clock signal ICK but may repeatedly output the monitoring result DPM_OUT whenever the filtered value is calculated.

Figure 4:
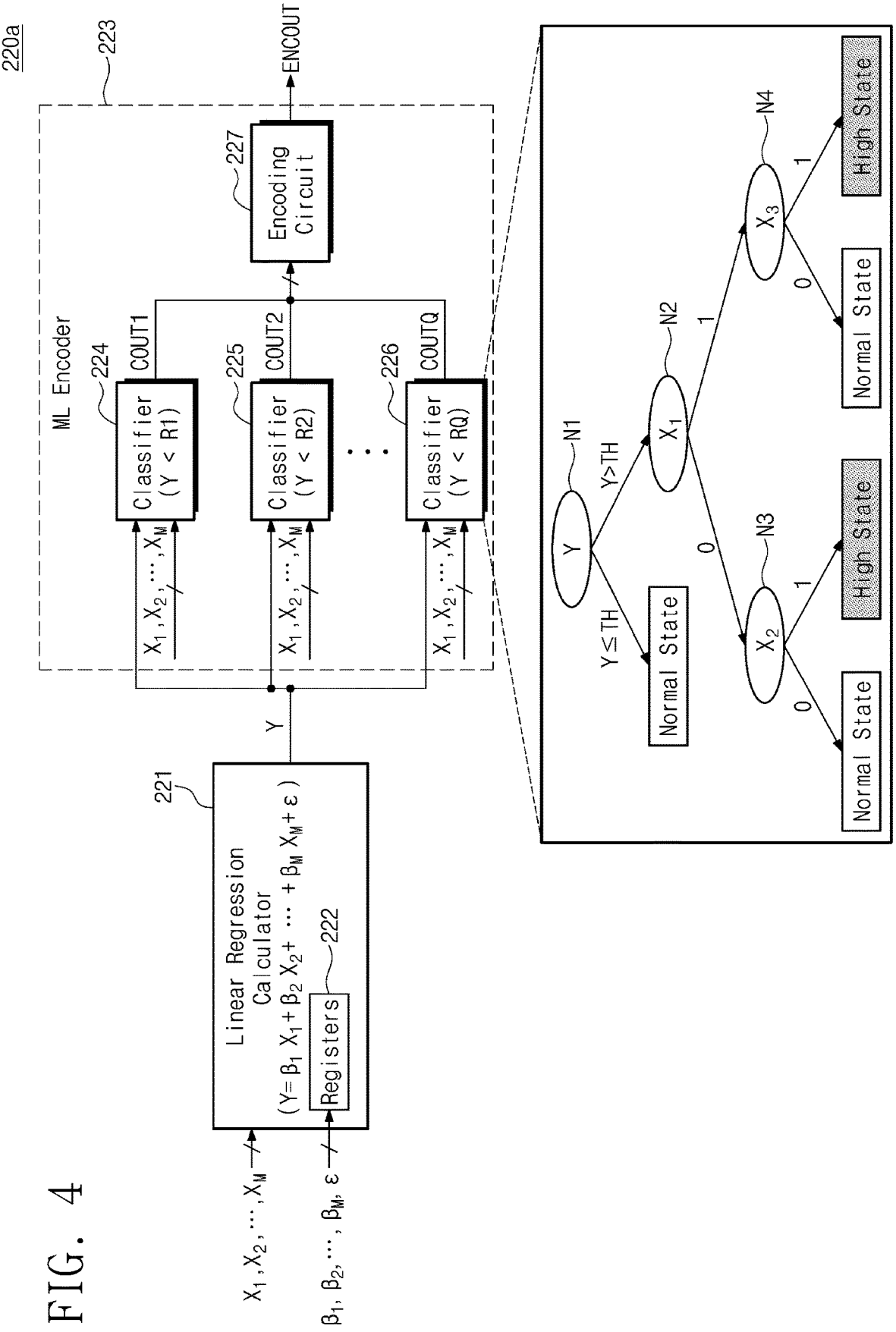
FIG. 4 illustrates a block diagram of a power calculator according to an example embodiment.

FIG. 4 illustrates a block diagram of a power calculator according to an example embodiment. A power calculator 220a is one implementation example of the power calculator 220. The power calculator 220a may include a linear regression calculator 221 and a machine learning based encoder 223. The linear regression calculator 221 may calculate a power value "Y", which is consumed by the core 100, based on a linear regression function of Equation 2 below. The linear regression calculator 221 may output the power value "Y" to the machine learning based encoder 223. The power calculator 220a may execute a power model that receives the state values $X_1, X_2 \ldots X_M$ and calculates the power value "Y".

$$Y = \beta_1 X_1 + \beta_2 X_2 + \ldots + \beta_M X_M + \varepsilon \quad \text{[Equation 2]}$$

The linear regression calculator 221 may perform various operations (e.g., multiplication and addition) on independent variables $X_1, X_2 \ldots X_M$ being state values provided from the input buffer 210, linear regression coefficients $\beta_1, \beta_2 \ldots \beta_M$, and an error variable $\varepsilon$. For example, the linear regression calculator 221 may include circuits (e.g., logic gates) performing various operations, and may further include registers 222 storing the linear regression coefficients $\beta_1, \beta_2 \ldots \beta_M$ and the error variable $\varepsilon$. For example, the linear regression coefficients $\beta_1, \beta_2 \ldots \beta_M$ and the error variable $\varepsilon$ may be determined in advance according to a flowchart of FIG. 6 below. For another example, the linear regression coefficients $\beta_1, \beta_2 \ldots \beta_M$ and the error variable $\varepsilon$ stored in the registers 222 may be updated to values transmitted from a user or an external device and may be configurable.

The machine learning based encoder 223 may execute a classification model that classifies the power value "Y". The machine learning based encoder 223 may include classifiers 224 to 226 and an encoding circuit 227. Each of the classifiers 224 to 226 may classify or determine whether the power value "Y" belongs to any range of a plurality of ranges R1, R2 ... RQ (Q being a natural number of 2 or more). The plurality of ranges R1 to RQ may correspond to the entire range from a minimum value of the power value "Y" to a maximum value of the power value "Y". For example, when the power value "Y" belongs to the range R1, the classifier 224 may output a classification output signal COUT1 having a second logical value (or a first logical value), and the remaining classifiers 225 to 226 may respectively output classification output signals COUT2 to COUTQ each having the first logical value (or the second logical value). The encoding circuit 227 may perform an encoding operation on a classification result including the classification output signals COUT1 to COUTQ and may output the power classification value ENCOUT. For example, when the number of classification output signals COUT1 to COUTQ is $2^X$ (X being a natural number), the encoding circuit 227 may output the power classification value ENCOUT of "X" bits. As described above, the power classification value ENCOUT may indicate whether the power value "Y" belongs to any range of the plurality of ranges R1 to RQ.

In an example embodiment, each of the classifiers 224 to 226 may classify whether the power value "Y" belongs to any range, by using a decision tree. Each of the classifiers 224 to 226 may receive the state values $X_1, X_2 \ldots X_M$ and the power value "Y". For example, the classifier 226 may compare the power value "Y" and a threshold value TH. The threshold value TH may indicate the range RQ and may separate the ranges R1 to RQ. For example, the classifier 226 may determine whether the state values $X_1, X_2 \ldots X_M$ have any logical value. The classifier 226 may determine whether the power value "Y" belongs to the range RQ, by using a comparison result of the power value "Y" and the threshold value TH and the state values $X_1, X_2 \ldots X_M$. For example, a normal state may indicate that the power value "Y" does not belong to the range RQ, and a high state may indicate that the power value "Y" belongs to the range RQ. The decision tree of FIG. 4 that is executed by the classifier 226 is only one example. That is, the number of threshold values TH and the number of state values $X_1, X_2,$ and $X_3$ are only one example. Also, paths that are determined as the normal state or the high state according to the comparison result of the power value "Y" and the threshold value TH and the state values $X_1, X_2 \ldots X_M$ are only one example. The remaining classifiers 224 to 225 may be implemented to be substantially similar to the classifier 226, and the ranges R1 to RQ that the classifiers 224 to 226 respectively determine may be different from each other.

Figure 5:
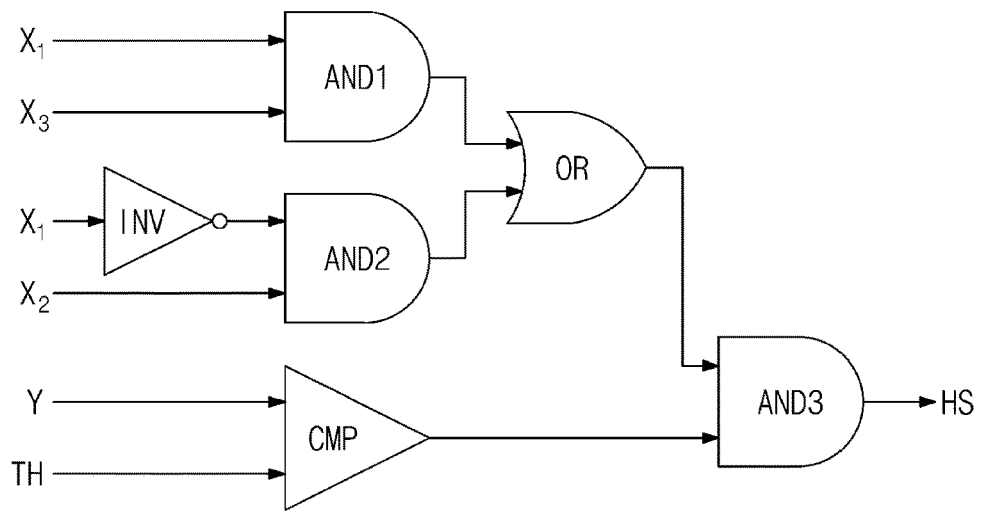
FIG. 5 illustrates a block diagram of a classifier according to an example embodiment.

FIG. 5 illustrates a block diagram of a classifier according to an example embodiment. The classifier 226 may include a logic gate AND1 that performs an AND operation on the state values $X_1$ and $X_3$, an inverter INV that performs an inversion operation on the state value $X_1$, a logic gate AND2 that performs an AND operation on an output of the inverter INV and the state value $X_2$, a logic gate OR that performs an OR operation on outputs of the logic gates AND1 and AND2, a comparator CMP that compares the power value "Y" and the threshold value TH, and a logic gate AND3 that performs an AND operation on outputs of the logic gate OR and the comparator CMP. The implementation example of the classifier 226 illustrated in FIG. 5 is only one of various implementation examples. The classifier 226 may be implemented to be different from the example illustrated in FIG. 5, according to the range RQ and a configuration of the decision tree.

Figure 6:
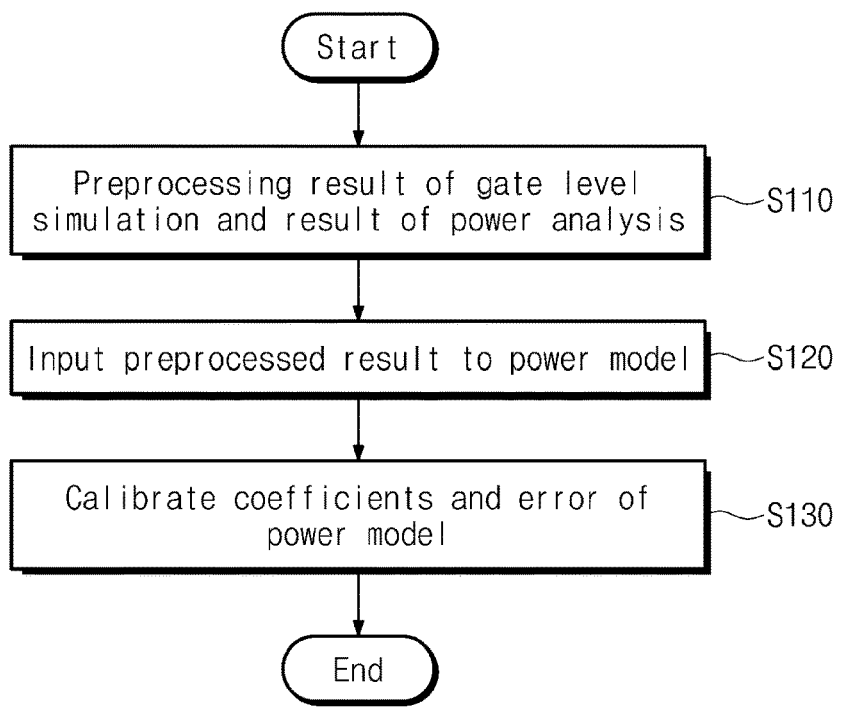
FIG. 6 illustrates a flowchart of generating a power model executable by a linear regression calculator according to an example embodiment.

FIG. 6 illustrates a flowchart of generating a power model executable by a linear regression calculator according to an example embodiment. In operation S110, a result of a gate level simulation and a result of a power analysis may be preprocessed. The result of the gate level simulation may include the state values $X_1, X_2 \ldots X_M$. For example, the result of the gate level simulation and the result of the power analysis may be a Verilog or power simulation result. A pre-processed result of Table 1 below may be generated through operation S110. The pre-processed result may include logical values "0" and "1" of the state values at cycles Cycle 1, Cycle 2 . . . Cycle Z (Z being a natural number) of the clock signal ICK and power simulation values P1, P2 . . . PZ being the result of the power analysis. The state values $X_1, X_2 \ldots X_M$ and the power simulation values P1, P2 . . . PZ may be mapped through operation S110 every cycle of the clock signal ICK.

TABLE 1

| ICK | Power | $X_1$ | $X_2$ | . . . | $X_M$ |
|---|---|---|---|---|---|
| Cycle 1 | P1 | 0 | 1 | . . . | 1 |
| Cycle 2 | P2 | 1 | 1 | . . . | 0 |
| . . . | . . . | . . . | . . . | . . . | . . . |
| Cycle Z | PZ | 1 | 1 | . . . | 0 |

In operation S120, the pre-processed result of operation S110 may be input to the power model that is executable by the linear regression calculator 221. In operation S130, the linear regression coefficients $\beta_1, \beta_2 \ldots \beta_M$ and the error variable c of the power model may be calibrated or adjusted. For example, the linear regression coefficients $\beta_1, \beta_2 \ldots \beta_M$ and the error variable c of the power model may be calibrated or adjusted such that the power values "Y" of the cycles Cycle 1, Cycle 2 . . .Cycle Z of the clock signal ICK, which are calculated by the power model of the linear regression calculator 221, are maximally matched with the power simulation values P1, P2 . . . PZ of Table 1 above. For example, the linear regression coefficients $\beta_1, \beta_2 \ldots \beta_M$ and the error variable ε calibrated through operation S130 may be stored or updated in advance in the registers 222.

Figure 7:
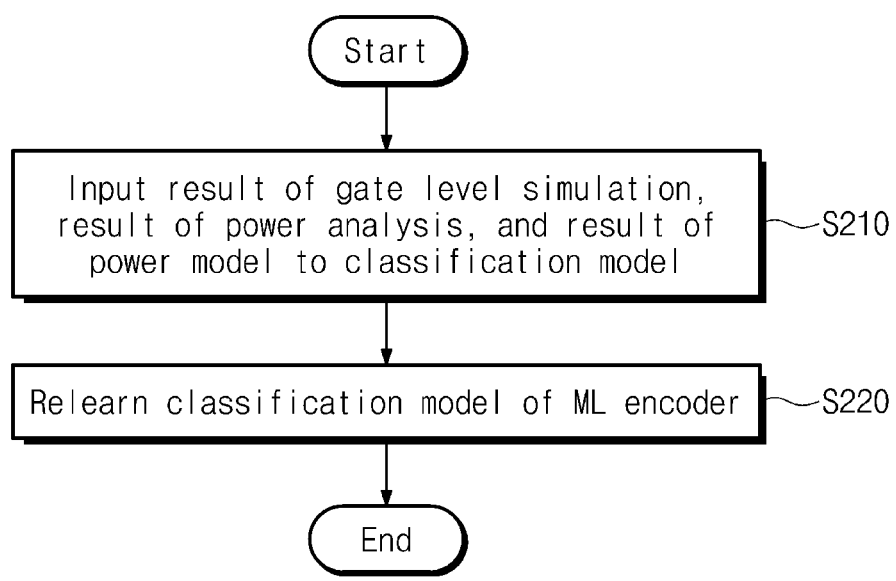
FIG. 7 illustrates a flowchart of generating a classification model executable by a machine learning based encoder according to an example embodiment.

FIG. 7 illustrates a flowchart of generating a classification model executable by a machine learning based encoder according to an example embodiment. In operation S210, a result of a gate level simulation, a result of a power analysis, and a result of a power model may be input to a classification model. The result of the gate level simulation and the result of the power analysis of operation S210 are similar to the result of the gate level simulation and the result of the power analysis of operation S110, respectively. The result of the power model may include the power values "Y" calculated by the power model having the linear regression coefficients $\beta_1, \beta_2 \ldots \beta_M$ and the error variable c calculated through operation S110 to operation S130, that is, the power values "Y" calculated by the linear regression calculator 221. In operation S220, a classification model executable by the machine learning based encoder 223 may be relearned (e.g., XGBoost). For example, the classification model may be relearned such that the power classification value ENCOUT generated by the classification model receiving the result (i.e., the state values $X_1, X_2 \ldots X_M$) of the gate level simulation and the result (i.e., the power values "Y") of the power model is maximally matched with an actual power classification value indicating a range to which the result (i.e., the power simulation values P1, P2 . . . PZ) of the power analysis actually belongs. According to the relearning result of operation S220, the classifiers 224 to 226 may be implemented in various hardware manners.

In an example embodiment, any electronic device that is used to design and implement the integrated circuit 10 may include a processor that generates the result of the gate level simulation and the result of the power analysis according to a request of the user and executes operation S110 to operation S130, and a storage device that stores an execution result of operation S110 to operation S130 and a program code describing operation S110 to operation S130. Also, the processor of the electronic device may further execute operation S210 and operation S220 according to a request of the user. Also, the storage device of the electronic device may further store an execution result of operation S210 and operation S220 and a program code describing operation S210 and operation S220.

Figure 8:
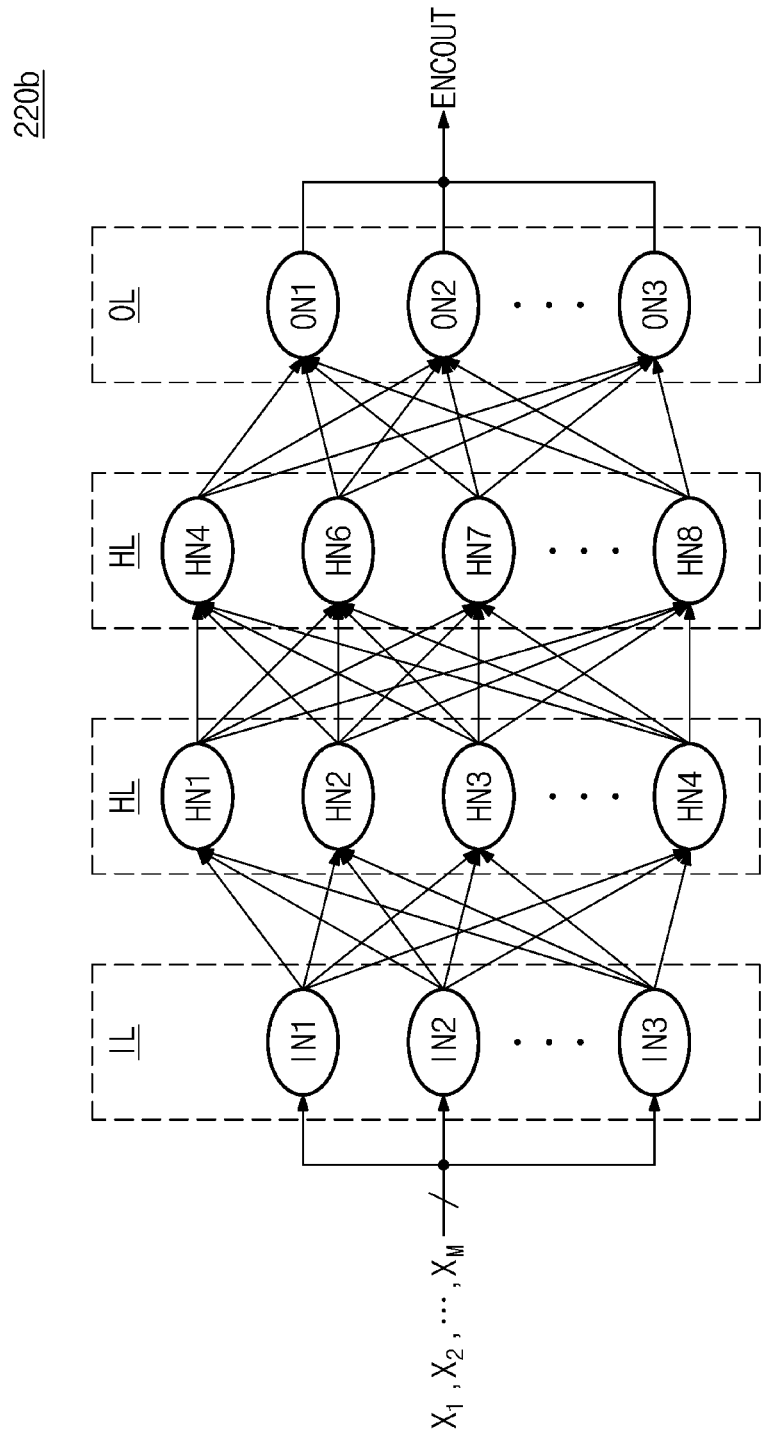
FIG. 8 illustrates a power calculator according to an example embodiment.

FIG. 8 illustrates a power calculator according to an example embodiment. A power calculator 220b is one implementation example of the power calculator 220. The power calculator 220b may include an input layer IL, hidden layers HL, and an output layer OL and may execute a deep neural network (DNN) implemented in the form of hardware. The number of layers IL, HL, and OL, the number of nodes IN1 to IN3 included in the layer IL, the number of nodes HN1 to HN8 included in the layer HL, the number of nodes ON1 to ON3 included in the layer OL, and connections between the nodes IN1 to IN3, HN1 to HN8, and ON1 to ON3 are not limited to the example illustrated in FIG. 8. The deep neural network DNN may receive the state values $X_1, X_2 \ldots X_M$ and may output the power classification value ENCOUT. The power classification value ENCOUT of the power calculator 220b of FIG. 8 and the power classification value ENCOUT of the power calculator 220a of FIG. 4 may be similar to each other.

Figure 9:
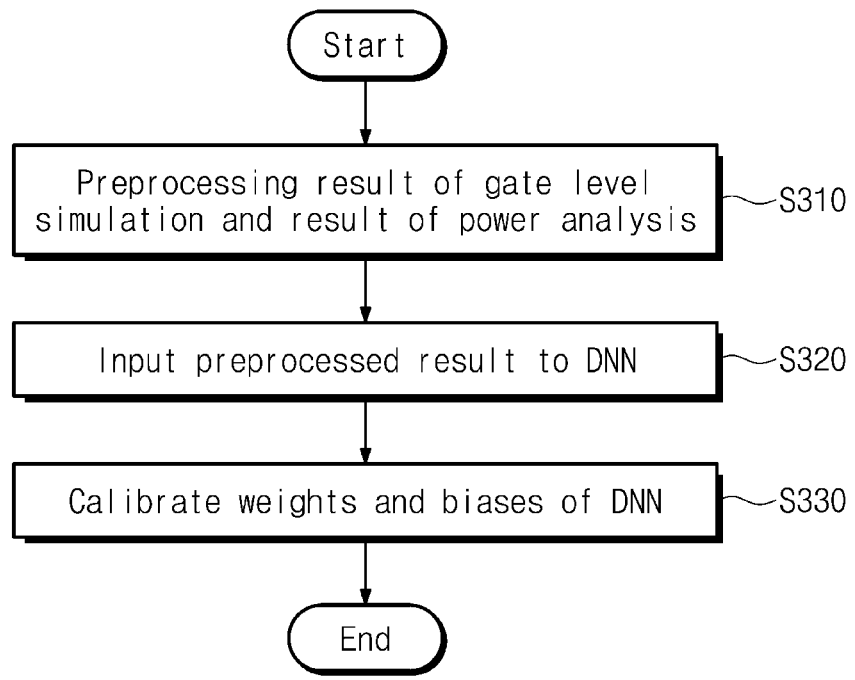
FIG. 9 illustrates a flowchart of generating a deep neural network executable by a power calculator according to an example embodiment.

FIG. 9 illustrates a flowchart of generating a deep neural network executable by a power calculator according to an example embodiment. In operation S310, a result of a gate level simulation and a result of a power analysis may be preprocessed. Operation S310 may be substantially similar to operation S110. In operation S320, the pre-processed result of operation S310 may be input to the deep neural network DNN that is executable by the power calculator 220b. In operation S330, weights between the nodes IN1 to IN3, HN1 to HN8, and ON1 to ON3 of the deep neural network DNN and biases of the nodes IN1 to IN3, HN1 to HN8, and ON1 to ON3 may be calibrated. For example, the weights and the biases may be relearned such that the power classification value ENCOUT generated by the deep neural network DNN receiving the result (i.e., the state values $X_1, X_2 \ldots X_M$) of the gate level simulation is maximally matched with an actual power classification value indicating a range to which the result (i.e., the power simulation values P1, P2 . .. PZ) of the power analysis actually belongs. According to the relearning result of operation S320, the deep neural network DNN executable by the power calculator 220b may be variously implemented in a hardware manner.

In an example embodiment, any electronic device that is used to design and implement the integrated circuit 10 may include a processor that generates the result of the gate level simulation and the result of the power analysis according to a request of the user and executes operation S310 to operation S330, and a storage device that stores an execution result of operation S310 to operation S330 and a program code describing operation S310 to operation S330.

Figure 10:
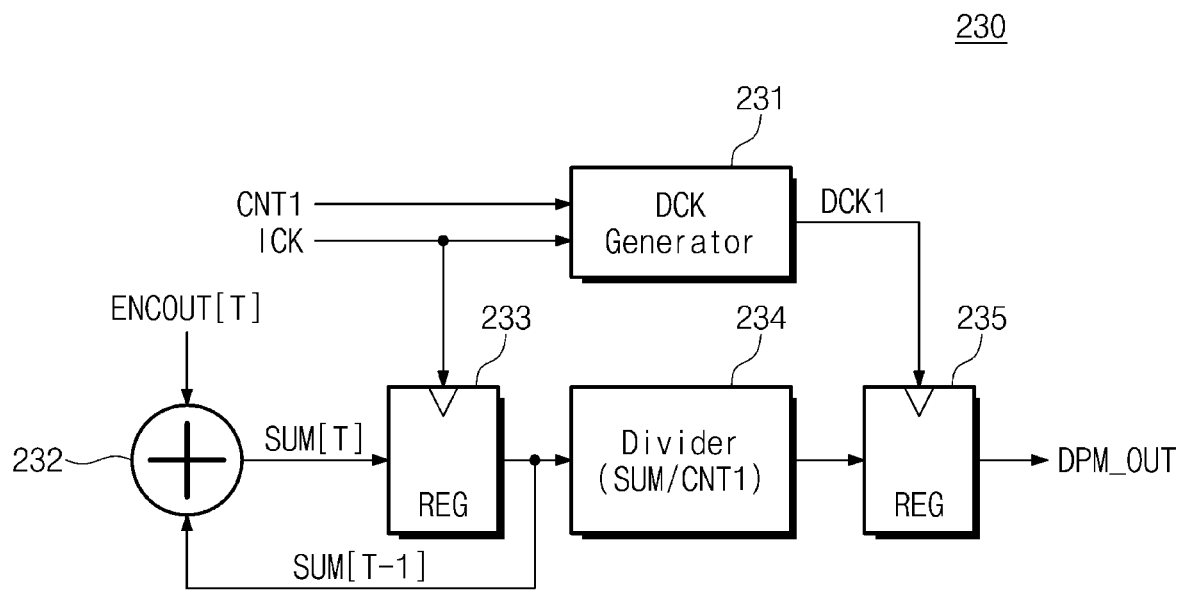
FIG. 10 illustrates a block diagram of a filter according to an example embodiment.

FIG. 10 illustrates a block diagram of a filter according to an example embodiment. The filter 230 may include a division clock generator 231, an adder 232, a register 233, a divider 234, and a register 235. The division clock generator 231 may receive a count value CNT1 and the clock signal ICK and may generate a division clock signal DCK1 by dividing the clock signal ICK based on the count value CNT1. For example, a frequency of the division clock signal DCK1 may correspond to a frequency obtained by dividing a frequency of the clock signal ICK by the count value CNT1. The count value CNT1 that is a division ratio may indicate an interval (a period) in which the power classification values ENCOUT are accumulated by the filter 230. For example, the count value CNT1 may be updated to a value received from the user or an external device and may be configurable. For another example, the count value CNT1 may be determined in advance and may be stored in advance in the division clock generator 231.

The adder 232 may add an accumulation sum SUM[T−1] and a current power classification value ENCOUT[T] and may output a current accumulation sum SUM[T]. Here, "T" may indicate a current cycle of the clock signal ICK, and "T−1" may indicate an immediately previous cycle of the clock signal ICK. The accumulation sum SUM[T−1] may be a value obtained by adding all previous power classification values ENCOUT[T−1] within an accumulation interval corresponding to the count value CNT1. The register 233 may store the current accumulation sum SUM[T] of a current cycle of the clock signal ICK at an edge of the clock signal ICK. The current accumulation sum SUM[T] stored in the register 233 may be provided to the divider 234. As time elapses, the current accumulation sum SUM[T] stored in the register 233 may be provided to the adder 232 as a new previous accumulation sum. The divider 234 may divide the current accumulation sum SUM[T] by the count value CNT1. The divider 234 may calculate a filtered value of all the power classification values ENCOUT accumulated during an accumulation interval corresponding to the count value CNT1. The register 235 may store the filtered value of the divider 234 at an edge of the division clock signal DCK1. The filter 230 may output the monitoring result DPM_OUT including the filtered value stored in the register 235. The implementation of the filter 230 is only one example, and the filter 230 may be implemented in the form of hardware so as to accumulate the power classification values ENCOUT of a plurality of cycles and output the monitoring result DPM_OUT including a filtered value of the accumulated power classification values ENCOUT.

Figure 11:
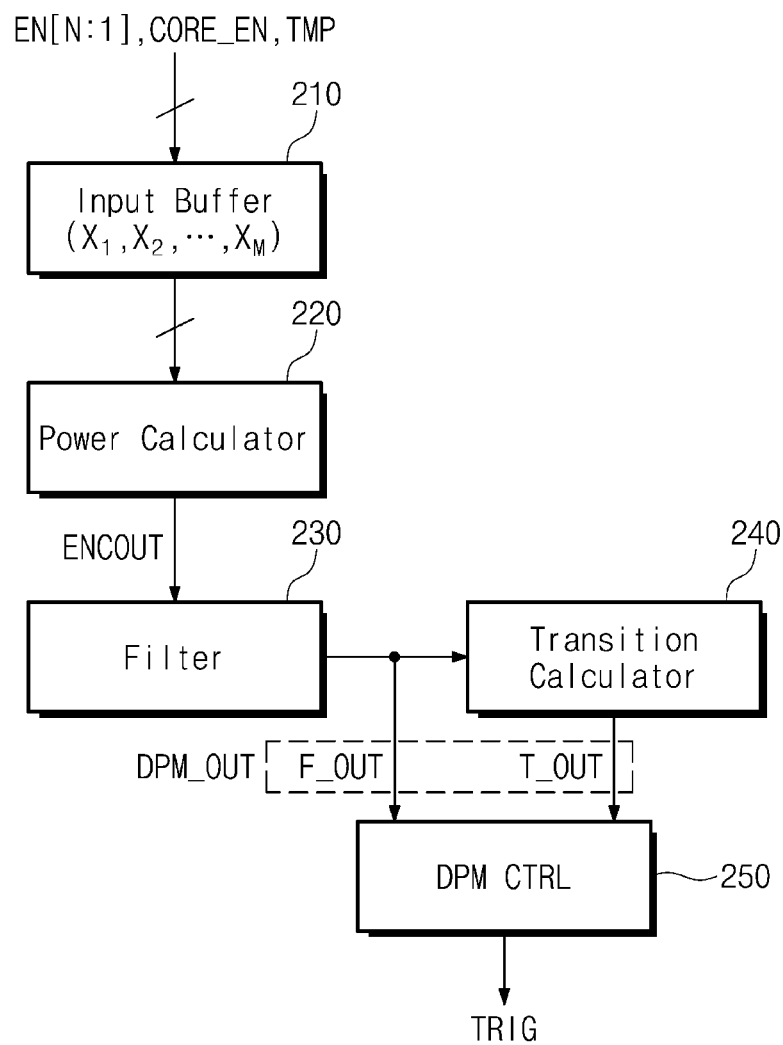
FIG. 11 illustrates a block diagram of a dynamic power monitor according to an example embodiment.

FIG. 11 illustrates a block diagram of a dynamic power monitor according to an example embodiment. A dynamic power monitor 200b may be another example of the dynamic power monitor 200 of FIG. 2 and may include the input buffer 210, the power calculator 220, the filter 230, a transition calculator 240, and an output controller 250. The input buffer 210, the power calculator 220, and the filter 230 are described above, and thus, additional description will be omitted to avoid redundancy.

The transition calculator 240 may repeatedly receive a filtered value F_OUT (similar to DPM_OUT of FIGS. 3 and 10) that is an output of the filter 230. The transition calculator 240 may calculate a slope indicating a variation in the filtered value F_OUT. The transition calculator 240 may calculate a difference value between the filtered values F_OUT received during a given interval. Here, the difference value may indicate a slope of how sharply the filtered values F_OUT fluctuate during the given interval. The transition calculator 240 may output the difference value as a transition value T_OUT.

Unlike the example illustrated in FIG. 11, the dynamic power monitor 200b may not include the output controller 250. In this case, the dynamic power monitor 200b may output the monitoring result DPM_OUT including the filtered value F_OUT of the filter 230 and the transition value T_OUT of the transition calculator 240, as illustrated in FIG. 1. Alternatively, to reduce the number of transmission lines necessary to output the monitoring result DPM_OUT, as illustrated in FIG. 11, the dynamic power monitor 200b may include the output controller 250. The output controller 250 may receive the monitoring result DPM_OUT including the filtered value F_OUT and the transition value T_OUT. The output controller 250 may output a trigger signal TRIG based on the filtered value F_OUT and the transition value T_OUT. The trigger signal TRIG may indicate whether any one of the filtered values F_OUT calculated by the filter 230 exceeds a reference value or whether any one of the transition values T_OUT calculated by the transition calculator 240 exceeds another reference value. As time elapses, the filtered values F_OUT may be repeatedly calculated by the filter 230, and the transition values T_OUT may be repeatedly calculated by the transition calculator 240. An interval where the trigger signal TRIG is enabled (or activated) may indicate any interval where any filtered value F_OUT exceeds the reference value or may indicate any interval where any transition value T_OUT exceeds the another reference value. As the dynamic power monitor 200b outputs not the monitoring result DPM_OUT but the trigger signal TRIG to the internal voltage regulator 130 and the clock managing unit 140 of FIG. 1, the number of transmission lines between the dynamic power monitor 200b and the components, that is, the internal voltage regulator 130 and the clock managing unit 140 may decrease.

Figure 12:
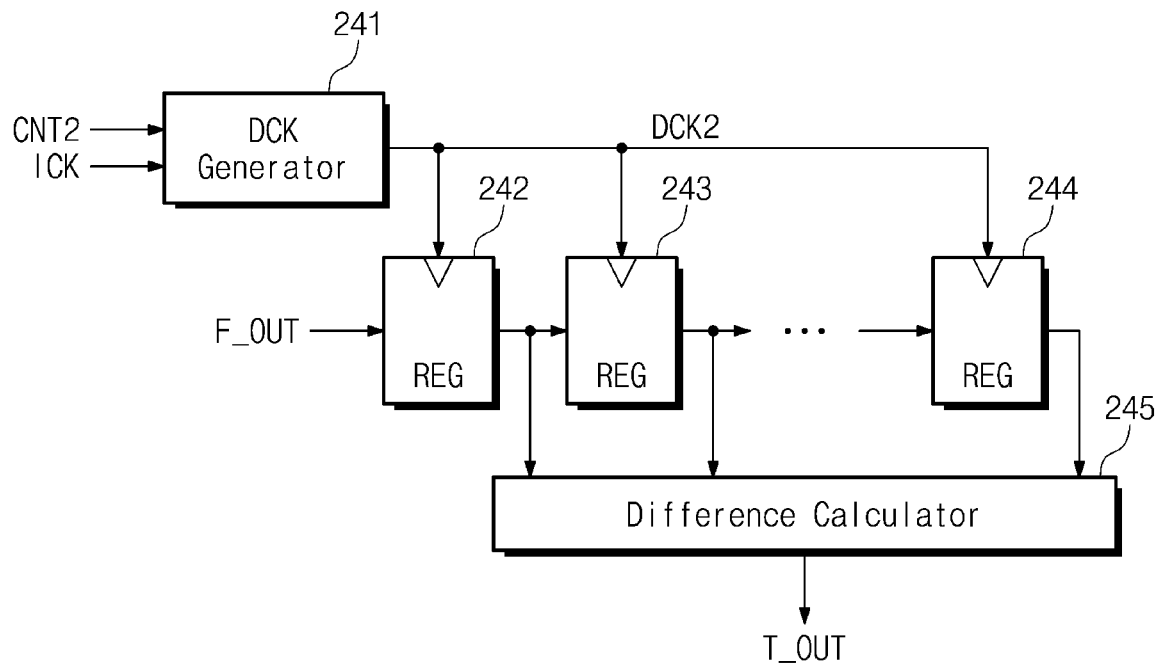
FIG. 12 illustrates a block diagram of a transition calculator according to an example embodiment.

FIG. 12 illustrates a block diagram of a transition calculator of FIG. 11. The transition calculator 240 may include a division clock generator 241, registers 242 to 244, and a difference calculator 245. The division clock generator 241 may receive a count value CNT2 and the clock signal ICK. As in the division clock generator 231, the division clock generator 241 may generate a division clock signal DCK2 by dividing the clock signal ICK based on the count value CNT2 and may provide the division clock signal DCK2 to the registers 242 to 244. For example, a frequency of the division clock signal DCK2 may be lower than the frequency of the division clock signal DCK1. For another example, the division clock generator 241 may generate the division clock signal DCK2 by dividing the division clock signal DCK1. For another example, the transition calculator 240 may not include the division clock generator 241; in this case, the division clock signal DCK1 may be directly provided to the registers 242 to 244.

The register 242 may store the filtered value F_OUT received from the filter 230 based on the division clock signal DCK2. The register 243 may store the filtered value F_OUT stored in the register 242 based on the division clock signal DCK2. For example, the registers 242 to 244 may constitute a shift register set, and the filtered value F_OUT may be sequentially shifted or propagated through the registers 242 to 244. The number of registers 242 to 244 may be determined in advance or configurable according to an interval for determining how sharply the filtered values F_OUT fluctuate. The number of registers 242 to 244 illustrated in FIG. 12 is only one example. The difference calculator 245 may calculate difference values between the filtered values F_OUT respectively stored in the registers 242 to 244. The difference calculator 245 may find a maximum difference value T_OUT of the difference values. The difference calculator 245 may output the maximum difference value as the transition value T_OUT. The implementation of the transition calculator 240 illustrated in FIG. 12 is only one example, and the transition calculator 240 may be variously implemented in the form of hardware so as to calculate and output a difference value of the filtered values F_OUT.

Figure 13:
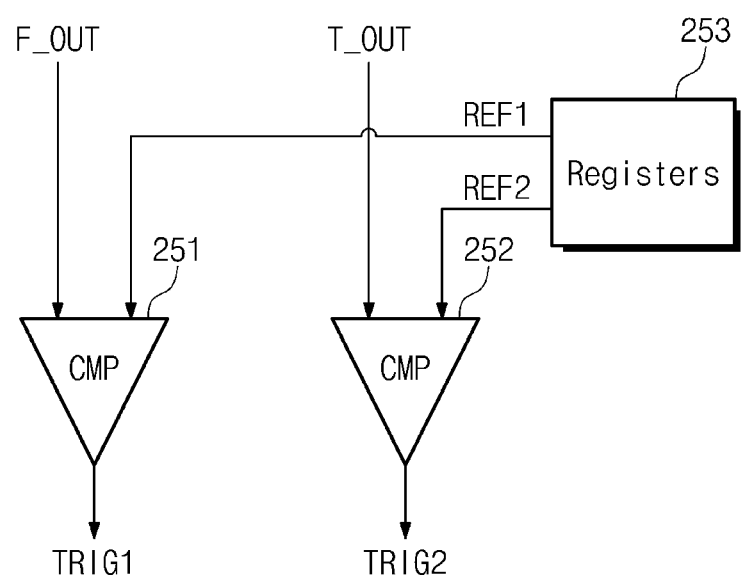
FIG. 13 illustrates a block diagram of an output controller according to an example embodiment.

FIG. 13 illustrates a block diagram of an output controller according to an example embodiment. The output controller 250 may include comparators 251 and 252 and registers 253. The comparator 251 may compare the filtered value F_OUT and a reference value REF1 and may enable a trigger signal TRIG1 when the filtered value F_OUT exceeds the reference value REF1. The comparator 252 may compare the transition value T_OUT and a reference value REF2 and may enable a trigger signal TRIG2 when the transition value T_OUT exceeds the reference value REF2. The registers 253 may store the reference values REF1 and REF2. The reference values REF1 and REF2 may be determined in advance or may be configurable. In an example embodiment, the number of trigger signals (TRIG of FIG. 12) may be one or more. As illustrated in FIG. 13, the trigger signal TRIG1 may indicate whether the filtered value F_OUT exceeds the reference value REF1, and the trigger signal TRIG2 may indicate whether the transition value T_OUT exceeds the reference value REF2. Unlike the example illustrated in FIG. 13, the number of reference values to be compared with the filtered value F_OUT may be one or more, and one or more trigger signals may indicate comparison results between the filtered value F_OUT and the one or more reference values. Unlike the example illustrated in FIG. 13, the number of reference values to be compared with the transition value T_OUT may also be one or more, and one or more trigger signals may indicate comparison results between the transition value T_OUT and the one or more reference values. In any case, the internal voltage regulator 130 may scale a level of the operating voltage IVDD based on one or more trigger signals TRIG, TRIG1, and TRIG2. Also, the clock managing unit 140 may scale a level of the operating voltage IVDD based on one or more trigger signals TRIG, TRIG1, and TRIG2.

Figure 14:
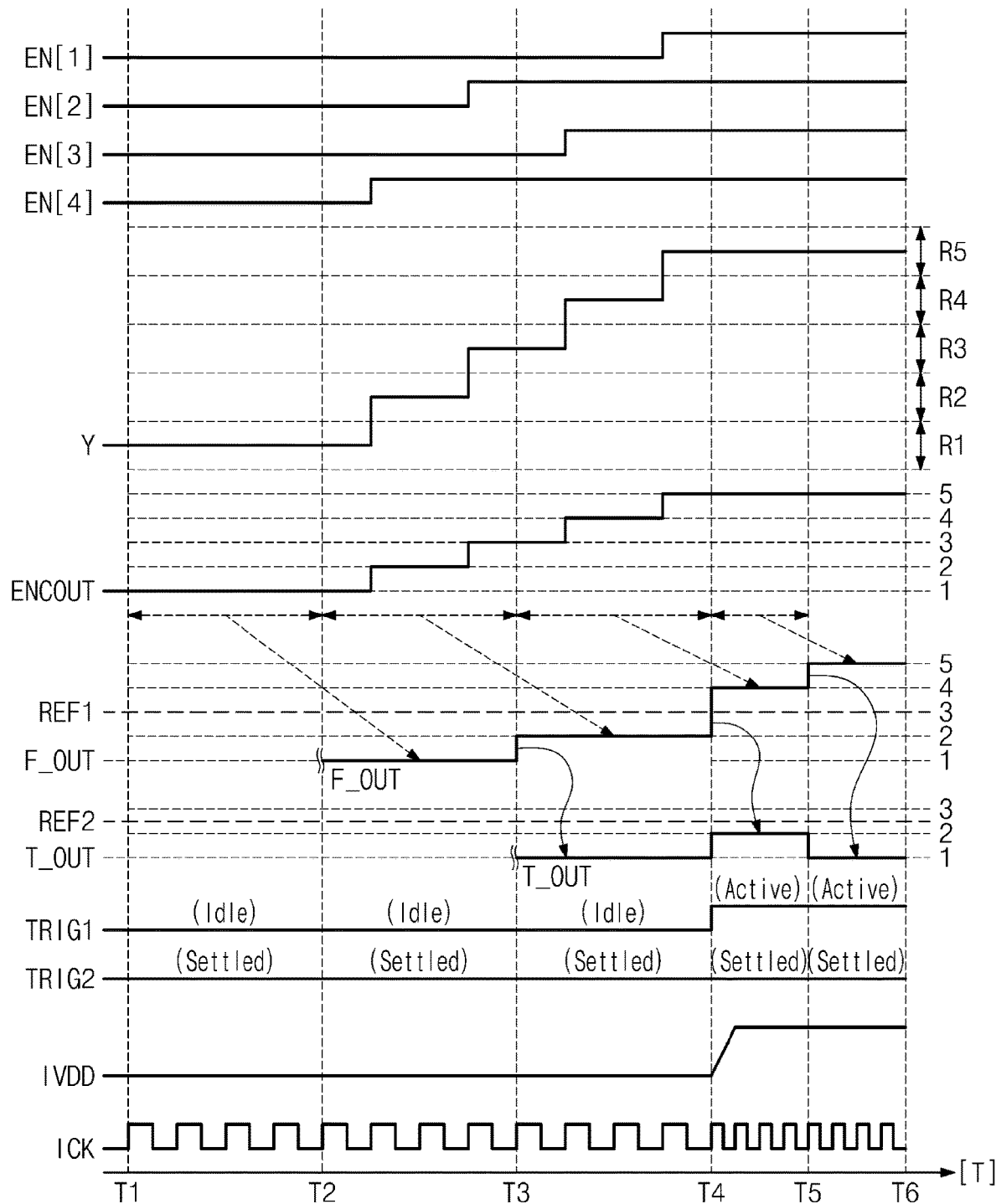
FIGS. 14 and 15 are timing diagrams illustrating operation of a dynamic power monitor according to an example embodiment.

FIG. 14 is a timing diagram illustrating an operation of a dynamic power monitor according to an example embodiment. It is assumed that the dynamic power monitor 200 receives only four clock gating signals EN[4:1], the machine learning based encoder 223 of the dynamic power monitor 200 includes five classifiers, the five classifiers classify whether the power value "Y" belongs to any range of five ranges R1 to R5, five power classification values ENCOUT respectively corresponding to the five ranges R1 to R5 are 1, 2, 3, 4, and 5, the filter 230 accumulates power classification values ENCOUT during four cycles of the clock signal ICK (i.e., a count value CNT1 is 4), the transition calculator 240 includes only two registers 242 and 243, the reference value REF1 is 3, the reference value REF2 is any value between 2 and 3, and the dynamic power monitor 200 outputs the two trigger signals TRIG1 and TRIG2 as illustrated in FIG. 13. However, example embodiments are not limited by the above assumption and numeric values.

During T1 to T2, all the clock gating signals EN[4:1] may be disabled (or deactivated), and all state values may be first logical values. During T1 to T2, the power value "Y" monitored by the dynamic power monitor 200 (or calculated by the linear regression calculator 221) every cycle of the clock signal ICK may belong to the range R1, and the power classification value ENCOUT may be 1. For example, during T1 to T2, all the trigger signals TRIG1 and TRIG2 may be disabled. A disabled trigger signal TRIG1 may indicate that the block 100 monitored by the dynamic power monitor 200 operates in an idle state (or consumes a relatively small amount of power), and an enabled trigger signal TRIG1 may indicate that the block 100 monitored by the dynamic power monitor 200 operates in an active state (or consumes a relatively large amount of power). A disabled trigger signal TRIG2 may indicate that the block 100 monitored by the dynamic power monitor 200 operates in a settled state in which power fluctuations are relatively small, and an enabled trigger signal TRIG2 may indicate that the block 100 monitored by the dynamic power monitor 200 operates in an unsettled state in which power fluctuations are relatively great. The internal voltage regulator 130 may scale a level of the operating voltage IVDD to be relatively low, based on the disabled trigger signal TRIG1. Also, the clock managing unit 140 may scale a frequency of the clock signal ICK to be relatively low, based on the disabled trigger signal TRIG1. The filter 230 may calculate the filtered value F_OUT of the four power classification values ENCOUT at four cycles of the clock signal ICK during T1 to T2. Because each of the four power classification values ENCOUT is "1", during T1 to T2, the filtered value F_OUT may be "1". During T1 to T2, because the filtered value F_OUT (=1) does not exceed the reference value REF1, the trigger signal TRIG1 may remain at a disabled state. The block 100 may operate in the idle state and the settled state.

During T2 to T3, the clock gating signal EN[4] may be enabled (or activated), and a state value of the clock gating signal EN[4] may be a second logical value. Then, the clock gating signal EN[2] may be enabled, and a state value of the clock gating signal EN[2] may be the second logical value. As the clock gating signals EN[4] and EN[2] are enabled, the power value "Y" may also increase. As the clock gating signal EN[4] is enabled, the power value "Y" may belong to the range R2 higher than the range R1. As the clock gating signal EN[2] is enabled, the power value "Y" may belong to the range R3 higher than the range R2. The filter 230 may calculate the filtered value F_OUT of the four power classification values ENCOUT at four cycles of the clock signal ICK during T2 to T3. Because the four power classification values ENCOUT are 1, 2, 2, and 3, during T3 to T4, the filtered value F_OUT may be "2". During T3 to T4, because the filtered value F_OUT (=2) does not exceed the reference value REF1, the trigger signal TRIG1 may remain at a disabled state. The transition calculator 240 may calculate the transition value T_OUT as a difference between the filtered value F_OUT (=1) of an interval from T2 to T3 and the filtered value F_OUT (=2) of an interval from T3 to T4, as "1". During T3 to T4, because the filtered value F_OUT (=1) does not exceed the reference value REF2, during T3 to T4, the trigger signal TRIG2 may remain at a disabled state. The block 100 may operate in the idle state and the settled state.

During T3 to T4, the clock gating signal EN[3] may be enabled, and a state value of the clock gating signal EN[3] may be the second logical value. Then, the clock gating signal EN[1] may be enabled, and a state value of the clock gating signal EN[1] may be the second logical value. As the clock gating signals EN[3] and EN[1] are enabled, the power value "Y" may also increase. As the clock gating signal EN[3] is enabled, the power value "Y" may belong to the range R4 higher than the range R3. As the clock gating signal EN[1] is enabled, the power value "Y" may belong to the range R5 higher than the range R4. The filter 230 may calculate the filtered value F_OUT of the four power classification values ENCOUT at four cycles of the clock signal ICK during T3 to T4. Because the four power classification values ENCOUT are 3, 4, 4, and 5, during T4 to T5, the filtered value F_OUT may be "4". During T4 to T5, because the filtered value F_OUT (=4) exceeds the reference value REF1, the trigger signal TRIG1 may be enabled. The internal voltage regulator 130 may scale a level of the operating voltage IVDD to be relatively high, based on the enabled trigger signal TRIG1. Also, the clock managing unit 140 may scale a frequency of the clock signal ICK to be relatively high, based on the enabled trigger signal TRIG1. The transition calculator 240 may calculate the transition value T_OUT as a difference between the filtered value F_OUT (=2) of an interval from T3 to T4 and the filtered value F_OUT (=4) of an interval from T4 to T5, as "2". During T4 to T5, because the filtered value F_OUT (=2) does not exceed the reference value REF2, during T4 to T5, the trigger signal TRIG2 may remain at a disabled state. The block 100 may operate in the active state and the settled state.

All the clock gating signals EN[4:1] may be enabled before the time T4, the power value "Y" may continue to belong to the range R5 after the time T4, and all the power classification values ENCOUT may be "5". The filter 230 may calculate the filtered value F_OUT of the four power classification values ENCOUT at four cycles of the clock signal ICK during T4 to T5. Because each of the four power classification values ENCOUT is "5", during T5 to T6, the filtered value F_OUT may be "5". During T5 to T6, because the filtered value F_OUT (=5) exceeds the reference value REF1, the trigger signal TRIG1 may remain at an enabled state. The transition calculator 240 may calculate the transition value T_OUT as a difference between the filtered value F_OUT (=4) of an interval from T4 to T5 and the filtered value F_OUT (=5) of an interval from T5 to T6, as "1". During T5 to T6, because the transition value T_OUT (=1) does not exceed the reference value REF2, during T5 to T6, the trigger signal TRIG2 may remain at a disabled state. The block 100 may operate in the active state and the settled state. The case where the trigger signal TRIG1 is enabled is described with reference to FIG. 14, and the case where all the trigger signals TRIG1 and TRIG2 are enabled will be described with reference to FIG. 15.

Figure 15:
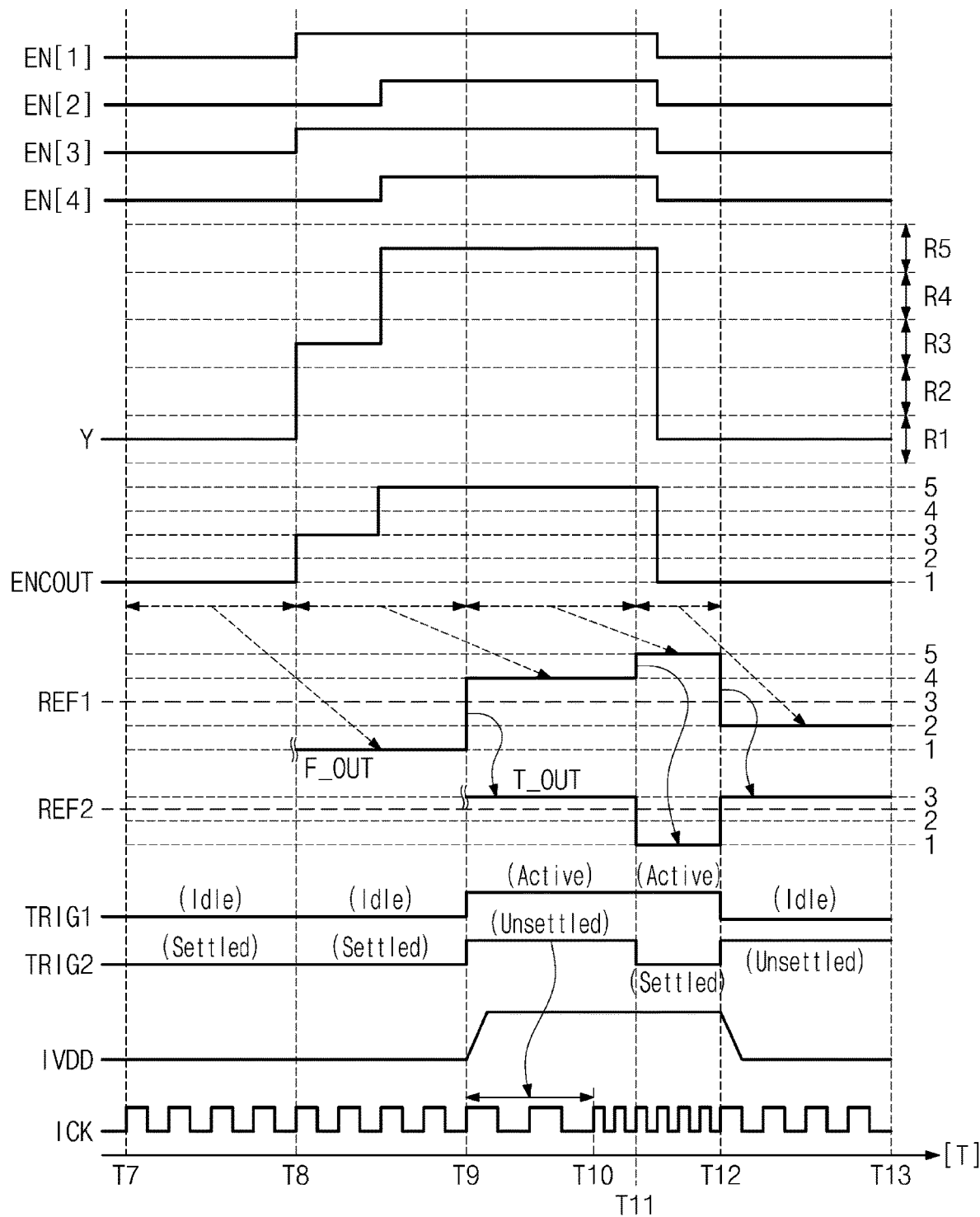

FIG. 15 is a timing diagram illustrating an operation of a dynamic power monitor according to an example embodiment. An operation of the dynamic power monitor 200 of an interval from T7 to T8 is substantially similar to the operation of the dynamic power monitor 200 of the interval from T1 to T2 discussed above with respect to FIG. 14.

The filter 230 may calculate the filtered value F_OUT of the four power classification values ENCOUT at four cycles of the clock signal ICK during T7 to T8. Because each of the four power classification values ENCOUT is "1", during T8 to T9, the filtered value F_OUT may be "1". During T8 to T9, because the filtered value F_OUT (=1) does not exceed the reference value REF1, the trigger signal TRIG1 may remain at a disabled state. The block 100 may operate in the idle state and the settled state.

During T8 to T9, the clock gating signals EN[1] and EN[3] may be enabled respectively, and state values of the clock gating signals EN[1] and EN[3] may be the second logical value. Then, the clock gating signals EN[2] and EN[4] may be enabled respectively, and state values of the clock gating signals EN[2] and EN[4] may be the second logical value. As the clock gating signals EN[4:1] are enabled, the power value "Y" may also increase. As the clock gating signals EN[1] and EN[3] are enabled, the power value "Y" may belong to the range R3 higher than the range R1. As the clock gating signals EN[2] and EN[4] are enabled, the power value "Y" may belong to the range R5 higher than the range R3. The filter 230 may calculate the filtered value F_OUT of the four power classification values ENCOUT at four cycles of the clock signal ICK during T8 to T9. Because the four power classification values ENCOUT are 3, 3, 5, and 5, during T9 to T11, the filtered value F_OUT may be "4". During T9 to T11, because the filtered value F_OUT (=4) exceeds the reference value REF1, the trigger signal TRIG1 may be enabled. The internal voltage regulator 130 may scale a level of the operating voltage IVDD to be relatively high, based on the enabled trigger signal TRIG1. Also, the clock managing unit 140 may scale a frequency of the clock signal ICK to be relatively high, based on the enabled trigger signal TRIG1.

The transition calculator 240 may calculate the transition value T_OUT as a difference between the filtered value F_OUT (=1) of an interval from T8 to T9 and the transition value T_OUT (=5) of an interval from T9 to T11, as "3". During T9 to T11, because the filtered value F_OUT (=3) exceeds the reference value REF2, the trigger signal TRIG2 may be enabled. The enabled trigger signal TRIG2 indicates sharp fluctuations of the power value "Y" in amount (or a slope of the power value "Y"). Accordingly, the clock managing unit 140 may scale a frequency of the clock signal ICK to be relatively high, based on the enabled trigger signal TRIG1 as described above; in addition, based on the enabled trigger signal TRIG2, the clock managing unit 140 may scale the frequency of the clock signal ICK to be relatively low during T9 to T10 and then may again scale the frequency of the clock signal ICK to be relatively high during T10 to T11. The above operation of the clock managing unit 140, in which the frequency of the clock signal ICK decreases and then increases according to the enable trigger signal TRIG2, may make it possible to prevent an in-rush current in the integrated circuit 10 and fluctuations in an operating voltage, which are caused when the integrated circuit 10 operates through a fast switch from a low-power mode to a high-power mode. The description is given as the clock managing unit 140 decreases the frequency of the clock signal ICK during T9 to T10 (during two periods of the clock signal ICK) as the trigger signal TRIG2 is enabled, but the clock managing unit 140 may decrease the frequency of the clock signal ICK during a time longer than two periods of the clock signal ICK. The block 100 may operate in the active state and the unsettled state.

All the clock gating signals EN[4:1] may be enabled before the time T9, the power value "Y" may continue to belong to the range R5 after the time T9, and all the power classification values ENCOUT may be "5". The filter 230 may calculate the filtered value F_OUT of the four power classification values ENCOUT at four cycles of the clock signal ICK during T9 to T11. Because each of the four power classification values ENCOUT is "5", during T11 to T12, the filtered value F_OUT may be "5". During T11 to T12, because the filtered value F_OUT (=5) exceeds the reference value REF1, the trigger signal TRIG1 may remain at an enabled state. The transition calculator 240 may calculate the transition value T_OUT as a difference between the filtered value F_OUT (=4) of an interval from T9 to T11 and the filtered value F_OUT (=5) of an interval from T11 to T12, as "1". Because the transition value T_OUT (=1) of an interval from T11 to T12, does not exceed the reference value REF2, during T11 to T12, the trigger signal TRIG2 may be disabled. The block 100 may operate in the active state and the settled state.

During T11 to T12, the clock gating signals EN[4:1] may be disabled respectively, and state values of the clock gating signals EN[4:1] may be the first logical value. As the clock gating signals EN[4:1] are disabled, the power value "Y" may also decrease. As the clock gating signals EN[4:1] are disabled, the power value "Y" may belong to the range R1 lower than the range R5. The filter 230 may calculate the filtered value F_OUT of the four power classification values ENCOUT at four cycles of the clock signal ICK during T11 to T12. Because the four power classification values ENCOUT are 5, 1, 1, and 1, during T12 to T13, the filtered value F_OUT may be "2". During T12 to T13, because the filtered value F_OUT (=2) does not exceed the reference value REF1, the trigger signal TRIG1 may be disabled. The internal voltage regulator 130 may scale a level of the operating voltage IVDD to be relatively low, based on the disabled trigger signal TRIG1. Also, the clock managing unit 140 may scale a frequency of the clock signal ICK to be relatively low, based on the disabled trigger signal TRIG1.

The transition calculator 240 may calculate the transition value T_OUT as a difference between the transition value T_OUT (=5) of an interval from T11 to T12 and the filtered value F_OUT (=2) of an interval from T12 to T13, as "3". During T12 to T13, because the filtered value F_OUT (=3) exceeds the reference value REF2, the trigger signal TRIG2 may be enabled. The enabled trigger signal TRIG2 indicates sharp negative fluctuations of the power value "Y" in amount (or a slope of the power value "Y").

For example, the enabled trigger signal TRIG2 may indicate a positive sign of fluctuations, and the disabled trigger signal TRIG2 may indicate a negative sign of fluctuations. For another example, the difference calculator 245 may check signs of differences by calculating differences of the filtered values F_OUT stored in the registers 242 to 244, and the difference calculator 245 may further output a sign in addition to the transition value T_OUT. The output controller 250 may further output another trigger signal indicating a sign of the difference calculator 245. In any case, a fluctuation direction (sign) of the power value "Y" may be determined by the dynamic power monitor 200.

As described above, the integrated circuit 10 may enter the idle state as the internal voltage regulator 130 scales a level of the operating voltage IVDD to be relatively low based on the disable trigger signal TRIG1 and the clock managing unit 140 scales a frequency of the clock signal ICK to be relatively low based on the disabled trigger signal TRIG1. However, the internal voltage regulator 130 and the clock managing unit 140 may allow the integrated circuit 10 to enter the idle state more quickly, based on the enabled trigger signal TRIG2 in addition to the disabled trigger signal TRIG1. Accordingly, the dynamic power monitor 200 may further reduce power consumption of the integrated circuit 10 by allowing the integrated circuit 10 to enter the idle state more quickly.

As illustrated in FIG. 15 the trigger signals TRIG1 and TRIG2 may be independent of each other. For example, both the trigger signals TRIG1 and TRIG2 are enabled during T9 to T11, and the trigger signal TRIG2 is enabled in a state where the trigger signal TRIG1 is disabled during T12 to T13. For example, during a time period the trigger signal TRIG1 may not exceed the reference value REF1. Also, during a time period the trigger signal TRIG1 may be disabled and the trigger signal TRIG2 may be enabled. In a time period all the trigger signals TRIG1 and TRIG2 may be enabled. The dynamic power monitor 200 may independently perform an operation of comparing the filtered value F_OUT and the reference value REF1 and an operation of comparing the transition value T_OUT and the reference value REF2. Accordingly, in FIGS. 14 and 15, logical values of the trigger signals TRIG1 and TRIG2, and a level of the operating voltage IVDD and a frequency of the clock signal ICK according to the trigger signals TRIG1 and TRIG2 all are only an example.

In an example embodiment, one reference value REF1 and one reference value REF2 are illustrated in FIGS. 14 and 15 as an example, but the number of reference values REF1 may be one or more and the number of reference values REF2 may be one or more. The dynamic power monitor 200 may determine whether the integrated circuit 10 operates in any power consumption state of two or more power consumption states (or modes) (e.g., the idle state and the active state in FIGS. 14 and 15) classified based on one or more reference values REF1, and the internal voltage regulator 130 and the clock managing unit 140 may respectively scale a level of the operating voltage IVDD and a frequency of the clock signal ICK according to a power consumption state monitored by the dynamic power monitor 200. Also, the dynamic power monitor 200 may determine whether the integrated circuit 10 operates in any power fluctuation state of two or more power fluctuation states (or modes) (e.g., the settled state and the unsettled state in FIGS. 14 and 15) classified based on one or more reference values REF2, and the internal voltage regulator 130 and the clock managing unit 140 may respectively scale a level of the operating voltage IVDD and a frequency of the clock signal ICK according to a power fluctuation state monitored by the dynamic power monitor 200.

Figure 16:
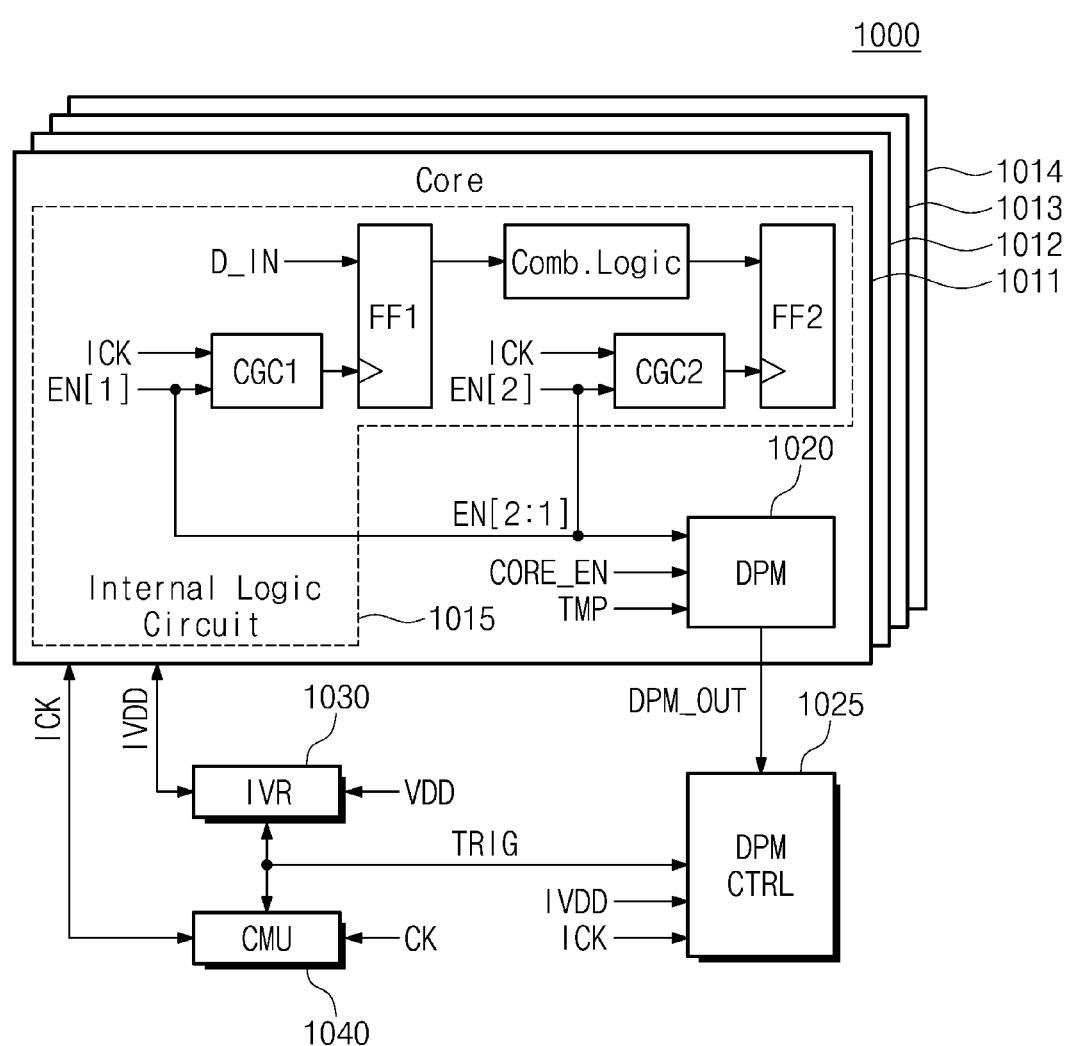
FIG. 16 illustrates a block diagram of a processor according to an example embodiment.

FIG. 16 illustrates a block diagram of a processor according to an example embodiment. A processor 1000 may include a plurality of cores (a multi-core) 1011 to 1014, an output controller 1025, an internal voltage regulator 1030, and a clock managing unit 1040. The cores 1011 to 1014 may be similar to each other, and the number of cores 1011 to 1014 are not limited to the example illustrated in FIG. 16. The core 1011 may include an internal logic circuit 1015 and a dynamic power monitor 1020. The internal logic circuit 1015 may include clock gating circuits CGC1 and CGC2, flip-flops FF1 and FF2, and a combinational logic circuit connected between the flip-flops FF1 and FF2, but the number of clock gating circuits CGC1 and CGC2, the number of flip-flops FF1 and FF2, and the number of combinational logic circuits are not limited to the example illustrated in FIG. 16. Operations of the above components are similar to the operations of the clock gating circuit CGC, the flip-flop FF, and the combinational logic circuit of FIG. 2. A configuration and an operation of the core 1011 may be similar to the configuration and the operation of the core 100 of FIG. 2. The dynamic power monitor 1020 may receive internal signals including at least some of the clock gating signals EN[2:1], the core enable signal CORE_EN, and the temperature signal TMP and may monitor a power of the core 1011 by using the internal signals. A configuration and an operation of the dynamic power monitor 1020 may be identical or similar to the configuration and the operation of the dynamic power monitor 200 of FIG. 2. The number of clock gating signals EN[2:1] is only one example. The core enable signal CORE_EN may be a signal of enabling or disabling the core 1011 and may be transmitted to each of the cores 1011 to 1014 from the outside of the processor 1000. The temperature signal TMP may indicate an operating state of the processor 1000 according to a temperature of the processor 1000 and may be transmitted in common to the cores 1011 to 1014 from the outside of the processor 1000.

The dynamic power monitors 1020 may be respectively disposed at the cores 1011 to 1014, and the output controller 1025 may respectively receive the monitoring results DPM_OUT from the dynamic power monitors 1020 of the cores 1011 to 1014. An operation of the output controller 1025 may be similar to the operation of the output controller 250 described above. The output controller 1025 may generate and output the trigger signal TRIG based on the monitoring results DPM_OUT. The monitoring results DPM_OUT may include the filtered values F_OUT of the power classification values ENCOUT of the cores 1011 to 1014 respectively monitored by the dynamic power monitor 1020 and may further include the transition values T_OUT being difference values between the filtered values F_OUT. For example, the output controller 1025 may determine whether any one of the filtered values F_OUT exceeds the reference value REF1. Also, the output controller 1025 may determine whether any one of the transition values T_OUT exceeds the reference value REF2. The trigger signal TRIG may indicate whether any one of the filtered values F_OUT exceeds the reference value REF1 or whether any one of the transition values T_OUT exceeds the reference value REF2. As described above, the number of trigger signals TRIG may be one or more. Configurations and operations of the internal voltage regulator 1030 and the clock managing unit 1040 may be substantially identical or similar to the configurations and the operations of the internal voltage regulator 130 and the clock managing unit 140. The internal voltage regulator 1030 may scale a level of the operating voltage IVDD to be supplied to the cores 1011 to 1014, based on the trigger signal TRIG. The clock managing unit 1040 may scale a frequency of the clock signal ICK to be supplied to the cores 1011 to 1014, based on the trigger signal TRIG. The internal logic circuit 1015 of each of the cores 1011 to 1014 may operate based on the operating voltage IVDD and the clock signal ICK.

Figure 17:
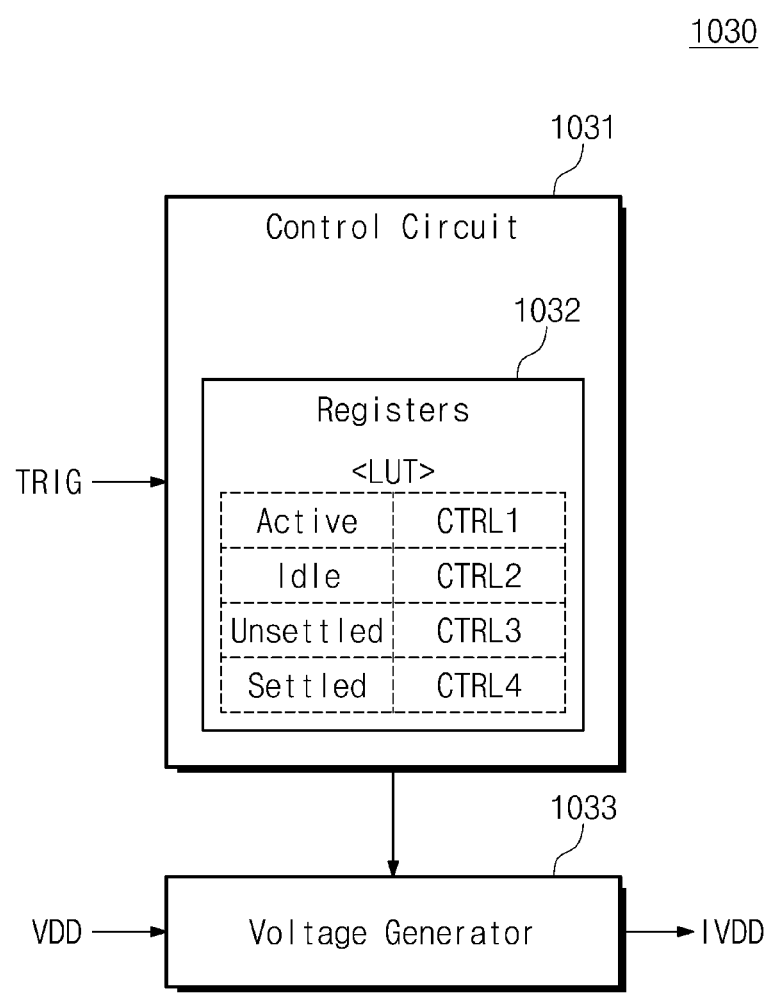
FIG. 17 illustrates a block diagram of an internal voltage regulator according to an example embodiment.

FIG. 17 illustrates a block diagram of an internal voltage regulator of FIG. 16. The internal voltage regulator 1030 may include a control circuit 1031 and a voltage generator 1033. The control circuit 1031 may include registers 1032 storing a lookup table LUT. The lookup table LUT may include control information CTRL1 to CTRL4 respectively corresponding to an active state, an idle state, an unsettled state, and a settled state that are classified according to the trigger signal TRIG. For example, each of the control information CTRL1 to CTRL4 may include information indicating a target level of the operating voltage IVDD. The control circuit 1031 may receive the trigger signal TRIG and may control the voltage generator 1033 based on control information according to a state that the trigger signal TRIG indicates. The voltage generator 1033 may generate and output the operating voltage IVDD based on the control information provided from the control circuit 1031 and the power supply voltage VDD.

Figure 18:
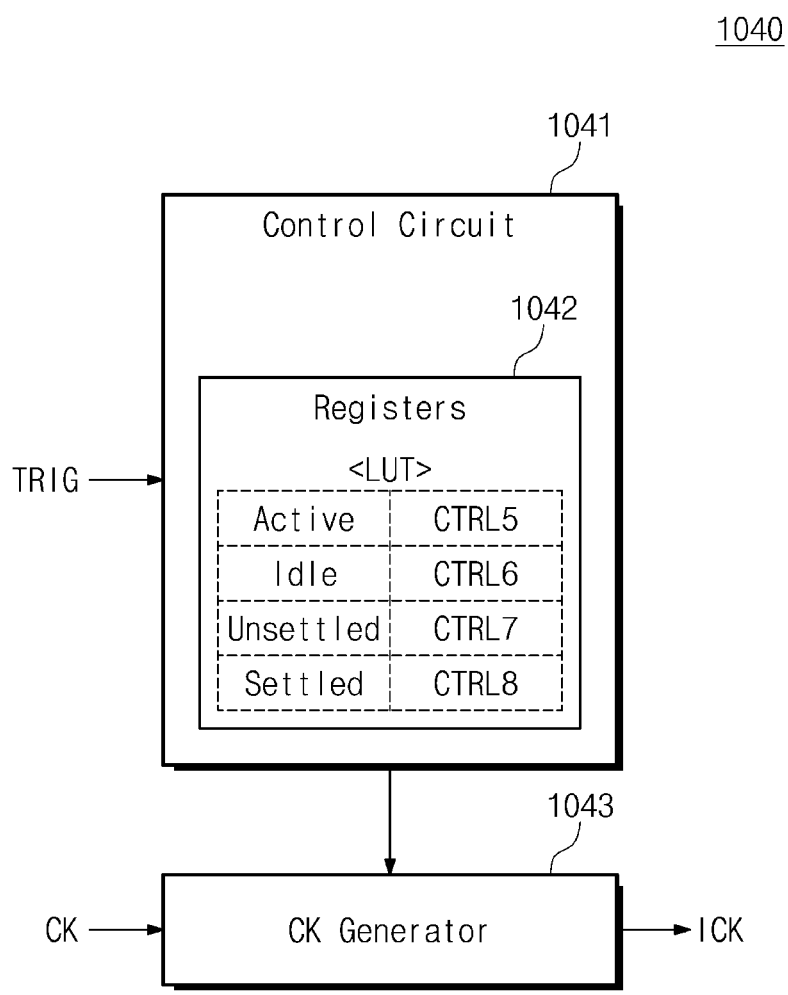
FIG. 18 illustrates a clock managing unit according to an example embodiment.

FIG. 18 illustrates a clock managing unit of FIG. 16. The clock managing unit 1040 may include a control circuit 1041 and a clock generator 1043. The control circuit 1041 may include registers 1042 storing a lookup table LUT. The lookup table LUT may include control information CTRL5 to CTRL8 respectively corresponding to an active state, an idle state, an unsettled state, and a settled state that are classified according to the trigger signal TRIG. For example, each of the control information CTRL5 to CTRL8 may include information indicating a target frequency of the clock signal ICK. The control circuit 1041 may receive the trigger signal TRIG and may control the clock generator 1043 based on control information according to a state that the trigger signal TRIG indicates. The clock generator 1043 may generate and output the clock signal ICK based on the control information provided from the control circuit 1041 and the clock signal CK.

Figure 19:
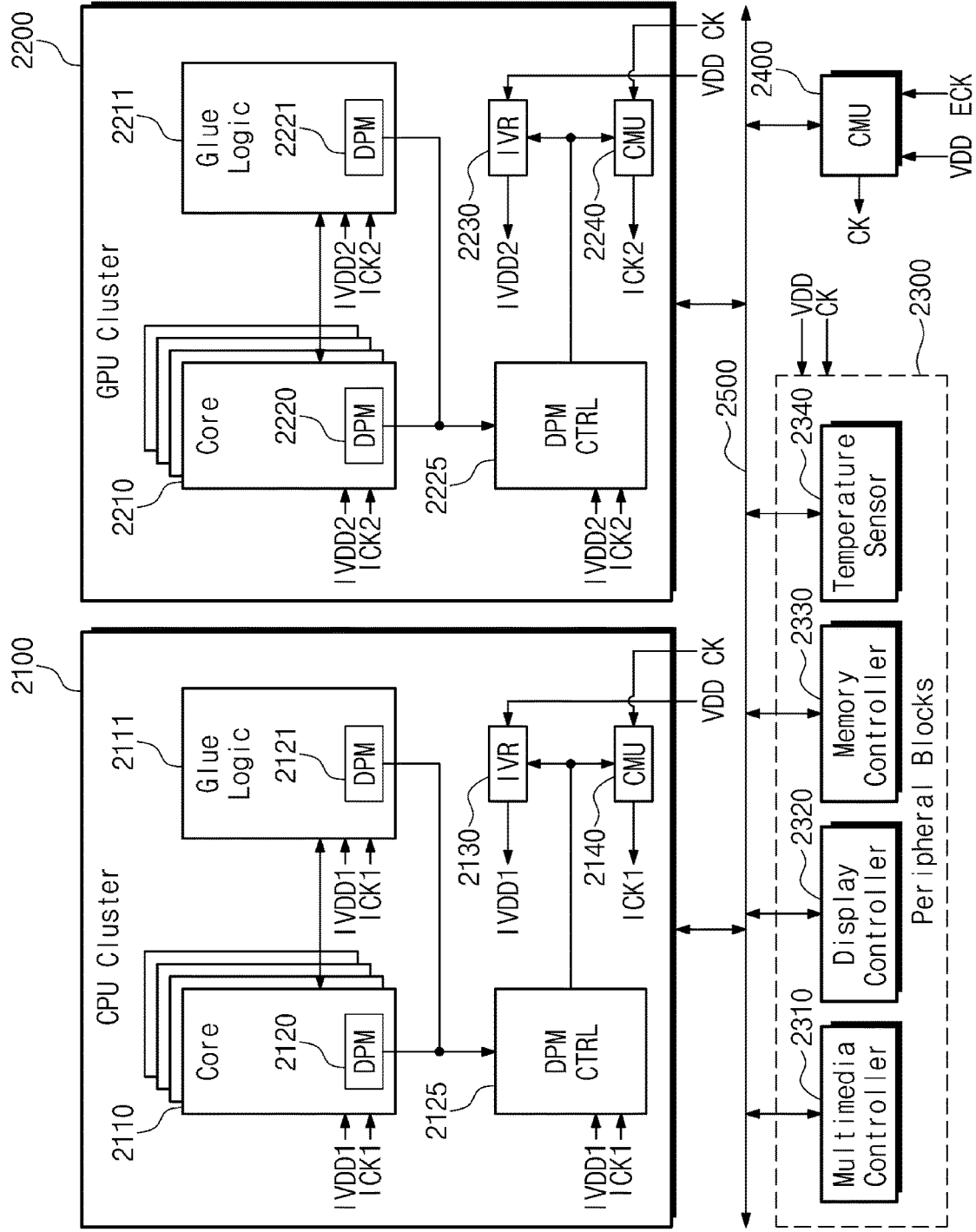
FIG. 19 illustrates a block diagram of a system on chip according to an example embodiment.

FIG. 19 illustrates a block diagram of a system on chip according to an example embodiment. A system on chip (SoC) 2000 that is an application processor AP may include a CPU cluster 2100, a graphics processing unit (GPU) cluster 2200, peripheral blocks 2300, and a clock managing unit 2400. A bus 2500 may provide interface and communication (or transmission) paths between the components 2100, 2200, 2300, and 2400.

A configuration of the CPU cluster 2100 may be similar to the configuration of the processor 1000 of FIG. 18. The CPU cluster 2100 may include cores 2110, a glue logic circuit 2111, an output controller 2125, an internal voltage regulator 2130, and a clock managing unit 2140. The cores 2110 may respectively include dynamic power monitors 2120, and configurations and operations of the cores 2110 may be similar to the configurations and operations of the cores 1011 to 1014. The glue logic circuit 2111 may include digital circuits configured to interconnect and interface the cores 2110 and a cache memory shared by the cores 2110. The glue logic circuit 2111 may operate based on an operating voltage IVDD1 and a clock signal ICK1. The glue logic circuit 2111 may include a dynamic power monitor 2121 that is substantially similar to the dynamic power monitor 2120. The dynamic power monitors 2120 of the cores 2110 and the dynamic power monitor 2121 of the glue logic circuit 2111 may respectively transmit monitoring results to the output controller 2125. Configurations and operations of the output controller 2125, the internal voltage regulator 2130, and the clock managing unit 2140 may be similar to the configurations and operations of the components 1025, 1030, and 1040 of the processor 1000 of FIG. 16, respectively.

A configuration of the GPU cluster 2200 may be similar to the configuration of the CPU cluster 2100. The GPU cluster 2200 may include cores 2210 each including a dynamic power monitor 2220, a glue logic circuit 2211 including a dynamic power monitor 2221, an output controller 2225, an internal voltage regulator 2230, and a clock managing unit 2240. Configurations and operations of the components 2210, 2211, 2220, 2221, 2225, 2230, and 2240 may be similar to the configurations and operations of the components 2110, 2111, 2120, 2121, 2125, 2130, and 2140, respectively. However, an internal logic circuit of each of the cores 2110 may be different from an internal logic circuit of each of the cores 2210.

The peripheral blocks 2300 may include a multimedia controller 2310 for controlling a multimedia device, a display controller 2320 for controlling a display device, a memory controller 2330 for controlling a main memory device, and a temperature sensor 2340. The peripheral blocks 2300 may further include different types of blocks. The temperature sensor 2340 may generate a temperature signal indicating a temperature of the system on chip 2000 and may provide the temperature signal to the CPU cluster 2100 and the GPU cluster 2200. For example, the temperature signal that is generated by the temperature sensor 2340 may correspond to the above temperature signal TMP.

The clock managing unit 2400 may receive an external power supply voltage VDD and an external clock signal ECK from external devices of the system on chip 2000. The clock managing unit 2400 may generate the clock signal CK based on the external power supply voltage VDD and the external clock signal ECK. The clock managing unit 2400 may supply the clock signal CK to the CPU cluster 2100, the GPU cluster 2200, and the peripheral blocks 2300. For example, the clock managing unit 2400 may respectively generate a block enable signal (e.g., the core enable signal CORE_EN of FIG. 16) for the CPU cluster 2100 and a block enable signal (e.g., the core enable signal CORE_EN of FIG. 16) for the GPU cluster 2200. The clock managing unit 2400 may further generate block enable signals for the peripheral blocks 2300.

The CPU cluster 2100 may receive the external power supply voltage VDD and the clock signal CK. The CPU cluster 2100 may perform the DVFS by using the dynamic power monitors 2120 and 2121, the output controller 2125, the internal voltage regulator 2130 supplying the operating voltage IVDD1, and the clock managing unit 2140 supplying the clock signal ICK1. The GPU cluster 2200 may receive the external power supply voltage VDD and the clock signal CK. The GPU cluster 2200 may perform the DVFS by using the dynamic power monitors 2220 and 2221, the output controller 2225, the internal voltage regulator 2230 supplying the operating voltage IVDD2, and the clock managing unit 2240 supplying the clock signal ICK2. The DVFS operation of the CPU cluster 2100 and the DVFS operation of the GPU cluster 2200 may be independent of each other. A level of the operating voltage IVDD1 and a level of the operating voltage IVDD2 may be independently calibrated, and a frequency of the clock signal ICK1 and a frequency of the clock signal ICK2 may be independently calibrated.

In an example embodiment, as in the CPU cluster 2100 and the GPU cluster 2200, the peripheral blocks 2300 may include one or more dynamic power monitors, one or more output controllers, one or more internal voltage regulators, and one or more clock managing units, and the peripheral blocks 2300 may perform the DVFS by using the above components, independently of the CPU cluster 2100 and the GPU cluster 2200.

Figure 20:
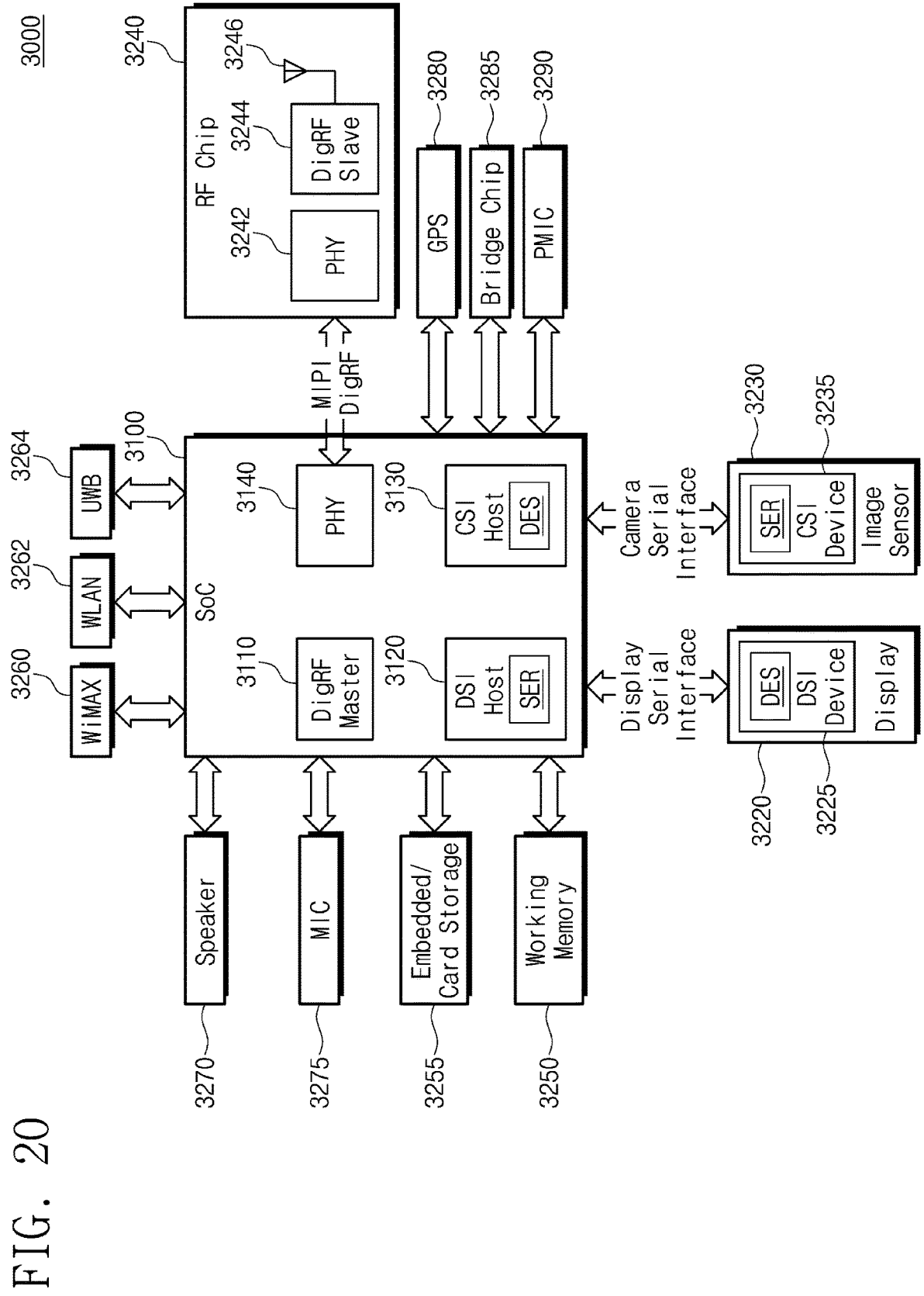
FIG. 20 illustrates a block diagram of an electronic device according to an example embodiment.

FIG. 20 illustrates a block diagram of an electronic device to which a system on chip of FIG. 19 is applied. An electronic device 3000 may be referred to as a "computing system", a memory system", an "electronic system", or a "communication system". For example, the electronic device 3000 may be a desktop computer, a laptop computer, a tablet computer, a mobile device, a smartphone, a personal digital assistant (PDA), a portable multimedia player (PMP), a wearable device, a video game console, a workstation, a server, a data processing device capable of using or supporting an interface protocol proposed by the mobile industry processor interface (MIPI) alliance, home appliances, a black box, a drone, etc. The electronic device 3000 may include a system on chip 3100, a display 3220, and an image sensor 3230. The system on chip 3100 may be the system on chip 2000 of FIG. 19, may include the components of the system on chip 2000, and may further include a DigRF master 3110, a display serial interface (DSI) host 3120, a camera serial interface (CSI) host 3130, and a physical layer 3140. The DSI host 3120 may communicate with a DSI device 3225 of the display 3220 through the DSI. For example, a serializer SER may be implemented in the DSI host 3120, and a deserializer DES may be implemented in the DSI device 3225. The CSI host 3130 may communicate with a CSI device 3235 of the image sensor 3230 through a CSI. For example, a deserializer DES may be implemented in the CSI host 3130, and a serializer SER may be implemented in the CSI device 3235. The electronic device 3000 may further include a radio frequency (RF) chip 3240 that communicates with the system on chip 3100. The RF chip 3240 may include a physical layer 3242, a DigRF slave 3244, and an antenna 3246. For example, the physical layer 3242 and the physical layer 3140 may exchange data with each other through a DigRF interface proposed by the MIPI alliance. The electronic device 3000 may further include a working memory 3250 and an embedded/card storage device 3255. The working memory 3250 and the embedded/card storage 3255 may store and output data associated with the system on chip 3100. The embedded storage device 3255 may be embedded in the electronic device 3000, and the card storage device 3255 that is a removable device may be mounted on the electronic device 3000. The electronic device 3000 may communicate with an external device/system through a communication module, such as a worldwide interoperability for microwave access (WiMAX) 3260, a wireless local area network (WLAN) 3262, or an ultra-wideband (UWB) 3264. The electronic device 3000 may further include a speaker 3270, a microphone 3275, a global positioning system (GPS) device 3280, and a bridge chip 3285. The electronic device 3000 may further include a power management integrated circuit (PMIC) 3290 that supplies a power supply voltage (refer to VDD of FIGS. 1 and 19) to the system on chip 3100.

A dynamic power monitor according to an example embodiment may monitor a power consumed at a block every cycle of a clock signal, and a DVFS may be quickly performed on the monitored block.

While example embodiments have been shown and described, it will be apparent to those skilled in the art that various changes and modifications may be made without departing from the spirit and scope of the present disclosure as set forth in the following claims.

What is claimed is:

1. A dynamic power monitor for monitoring power of a block in an integrated circuit, the dynamic power monitor comprising:
   an input buffer circuit configured to store state values corresponding to internal signals of the block according to a clock signal;
   power calculation circuitry configured to identify a first power classification value of the block corresponding to a first cycle of the clock signal based on the state values corresponding to the first cycle, and a second power classification value of the block corresponding to a second cycle of the clock signal based on the state values corresponding to the second cycle; and
   a filter circuit configured to identify a first filtered value corresponding to a first interval comprising the first cycle based on the first power classification value and a second filtered value corresponding to a second interval comprising the second cycle based on the second power classification value;
   transition calculation circuitry configured to identify a transition value based on a difference between the first filtered value and the second filtered value; and
   output circuitry configured to generate a trigger signal indicating whether the transition value exceeds a reference value.

2. The dynamic power monitor of claim 1, wherein the first power classification value and the second power classification value are selected from among a plurality of ranges, each of which corresponds to a power range of the block.

3. The dynamic power monitor of claim 1, wherein the internal signals comprise at least one from among:
   a clock gating signal configured to control whether the clock signal is provided to a flip-flop of the block; and
   a block enable signal configured to selectively enable the block.

4. The dynamic power monitor of claim 1, wherein the power calculation circuitry is configured to implement:

a linear regression calculator configured to identify a first power value, based on the state values corresponding to the first cycle, linear regression coefficients, and an error variable; and an encoder configured to provide the first power classification value based on a classification of the first power value.

5. The dynamic power monitor of claim 1, wherein the power calculation circuitry is further configured to execute a deep neural network configured to receive the state values stored in the input buffer circuit and output the first power classification value and the second power classification value.

6. A processor comprising:
a plurality of cores, each of which comprises an internal logic circuit and a dynamic power monitor circuit, the internal logic circuit being configured to operate based on an operating voltage and a clock signal, and the dynamic power monitor circuit being configured to monitor power by using state values of internal signals of the internal logic circuit according to cycles of the clock signal to obtain filtered values of the power classification values of the cores and identify transition values based on difference values between the filtered values to obtain a monitoring result;
an output control circuit configured to generate a trigger signal based on the monitoring result obtained by the dynamic power monitor circuit of each of the plurality of cores;
a clock manager circuit configured to scale the clock signal provided to the plurality of cores based on the trigger signal; and
an internal voltage regulator configured to scale the operating voltage provided to the plurality of cores based on the trigger signal.

7. The processor of claim 6, wherein the dynamic power monitor circuit is configured to implement:
an input buffer configured to receive the internal signals and store the state values of the internal signals according to the cycles of the clock signal;
a power calculator configured to identify a power classification value of a corresponding core from among the plurality of cores, according to the cycles of the clock signal, based on the state values of the internal signals; and
a filter configured to identify, according to the cycles of the clock signal, the filtered values of the power classification value of the corresponding core, and
wherein the monitoring result comprises the filtered values.

8. The processor of claim 7, wherein the power classification value of the corresponding core indicates one from among a plurality of ranges divided corresponding to a power range of each of the plurality of cores.

9. The processor of claim 7, wherein the dynamic power monitor circuit is configured to implement a transition calculator configured to identify the difference values between the filtered values, and
wherein the monitoring result further comprises the difference values.

10. The processor of claim 9, wherein the trigger signal of the output control circuit indicates whether one of the filtered values exceeds a first reference value and whether one of the difference values exceeds a second reference value.

11. The processor of claim 10, wherein the clock manager circuit is further configured to increase a frequency of the clock signal based on the trigger signal indicating that one of the filtered values exceeds the first reference value, and
wherein the internal voltage regulator is further configured to increase a level of the operating voltage based on the trigger signal indicating that one of the filtered values exceeds the first reference value.

12. The processor of claim 10, wherein the clock manager circuit is further configured to decrease and then increase a frequency of the clock signal based on the trigger signal indicating that one of the difference values exceeds the second reference value.

13. The processor of claim 6, wherein the internal logic circuit comprises:
a first flip-flop;
a first clock gating circuit configured to gate the clock signal to the first flip-flop according to a first clock gating signal;
a second flip-flop;
a second clock gating circuit configured to gate the clock signal to the second flip-flop according to a second clock gating signal; and
a combinational logic circuit connected between the first flip-flop and the second flip-flop, and
wherein the internal signals comprise the first clock gating signal and the second clock gating signal.

14. The processor of claim 13, wherein the internal signals further comprise a core enable signal configured to selectively enable each of the plurality of cores and a temperature signal configured to selectively enable the processor according to a temperature of the processor.

15. A system on chip comprising:
a central processing unit cluster comprising a plurality of first cores, each of which comprises a first dynamic power monitor circuit configured to obtain a first monitoring result based on filtered values by filtering first power classification values provided by the first dynamic power monitor circuit of each of the plurality of first cores, and identify transition values based on difference values between the filtered values of each of the plurality of first cores;
a graphics processing unit cluster comprising a plurality of second cores, each of which comprises a second dynamic power monitor circuit configured to obtain a second monitoring result based on filtered values by filtering second power classification values provided by the second dynamic power monitor circuit of each of the plurality of second cores, and identify transition values based on difference values between the filtered values of each of the plurality of second cores;
a first internal voltage regulator configured to scale a first operating voltage provided to the plurality of first cores based on the first monitoring result, according to a first clock signal;
a first clock manager circuit configured to scale the first clock signal provided to the plurality of first cores based on the first monitoring result;
a second internal voltage regulator configured to scale a second operating voltage provided to the plurality of second cores based on the second monitoring result, according to a second clock signal; and
a second clock manager circuit configured to scale the second clock signal provided to the plurality of second cores based on the second monitoring result.

16. The system on chip of claim 15, wherein the first dynamic power monitor circuit is configured to generate the first monitoring result based on first state values of first internal signals of each of the plurality of first cores according to the first clock signal, and wherein the second dynamic power monitor circuit is configured to generate the second monitoring result based on second state values of second internal signals of each of the plurality of second cores according to the second clock signal.

17. The system on chip of claim 16, wherein the central processing unit cluster further comprises a first output control circuit configured to receive the first monitoring result and control the first internal voltage regulator and the first clock manager circuit based on the first monitoring result, and wherein the graphics processing unit cluster further comprises a second output control circuit configured to receive the second monitoring result and control the second internal voltage regulator and the second clock manager circuit based on the second monitoring result.

18. The system on chip of claim 15, wherein the first internal voltage regulator and the second internal voltage regulator are configured to generate, respectively, the first operating voltage and the second operating voltage based on a power supply voltage, and wherein the first clock manager circuit and the second clock manager circuit are configured to generate, respectively, the first clock signal and the second clock signal based on a third clock signal.

19. The processor of claim 6, wherein the internal logic circuit comprises:

a first flip-flop; and a first clock gating circuit configured to gate the clock signal to the first flip-flop according to a first clock gating signal, and wherein the internal signals comprise the first clock gating signal.

20. The system on chip of claim 15, wherein each of the plurality of first cores comprises a first flip-flop, a first clock gating circuit configured to gate the first clock signal to the first flip-flop according to a first clock gating signal, and wherein the first dynamic power monitor circuit of each of the plurality of first cores is configured to operate based on the first clock gating signal.

* * * * *